(12) United States Patent
Alshina et al.

(10) Patent No.: US 9,100,661 B2
(45) Date of Patent: Aug. 4, 2015

(54) METHOD AND APPARATUS FOR ENCODING VIDEO BY USING DYNAMIC-RANGE TRANSFORMATION, AND METHOD AND APPARATUS FOR DECODING VIDEO BY USING DYNAMIC-RANGE TRANSFORMATION

(75) Inventors: Elena Alshina, Suwon-si (KR); Alexander Alshin, Suwon-si (KR); Woo-jin Han, Suwon-si (KR); Tammy Lee, Seoul (KR); Yoon-mi Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1156 days.

(21) Appl. No.: 13/079,982

(22) Filed: Apr. 5, 2011

(65) Prior Publication Data

US 2011/0243232 A1   Oct. 6, 2011

(30) Foreign Application Priority Data

Apr. 5, 2010   (KR) .................. 10-2010-0031142
Jun. 14, 2010  (KR) .................. 10-2010-0056194

(51) Int. Cl.
*H04N 19/00*   (2014.01)
*H04N 19/61*   (2014.01)
*H04N 19/98*   (2014.01)

(52) U.S. Cl.
CPC .............. *H04N 19/61* (2014.11); *H04N 19/98* (2014.11)

(58) Field of Classification Search
CPC .............................. H04N 19/00; H04N 19/60
USPC ........................................................ 375/240.18
See application file for complete search history.

(56) References Cited

U.S. PATENT DOCUMENTS

| | | | |
|---|---|---|---|
| 2005/0114093 A1* | 5/2005 | Cha et al. .................. | 702/189 |
| 2007/0036443 A1 | 2/2007 | Srinivasan | |
| 2007/0147498 A1 | 6/2007 | Tanaka et al. | |
| 2009/0087111 A1* | 4/2009 | Noda et al. ................. | 382/238 |
| 2009/0180714 A1 | 7/2009 | Takahashi | |
| 2010/0172411 A1* | 7/2010 | Efremov et al. .......... | 375/240.12 |

OTHER PUBLICATIONS

International Search Report (PCT/ISA/210) and Written Opinion (PCT/ISA/237) issued by the International Searching Authority in corresponding International Application No. PCT/KR2011/002372 on Dec. 7, 2011.

* cited by examiner

*Primary Examiner* — Sath V Perungavoor
*Assistant Examiner* — Jeffery Williams
(74) *Attorney, Agent, or Firm* — Sughrue Mion, PLLC

(57) ABSTRACT

Provided is a method and apparatus for encoding a video by using dynamic range transformation based on content and a method and apparatus for decoding a video by using dynamic range transformation based on content. The encoding method includes: performing inter prediction, through motion estimation, and intra prediction for a current region using image data in which a dynamic range of the current region is transformed based on content of an image of input video; performing transformation on residual data generated by the intra prediction and the inter prediction and performing quantization on a transformation coefficient generated by the transformation; and performing entropy encoding on the quantized transformation coefficient.

40 Claims, 18 Drawing Sheets

FIG. 14
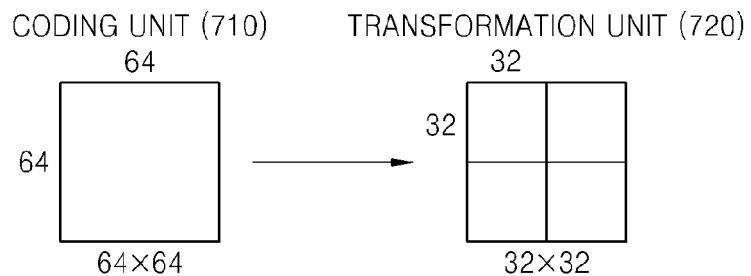
FIG. 15
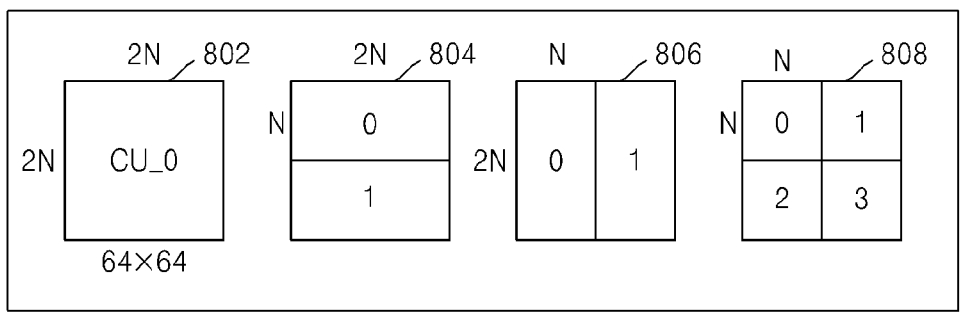
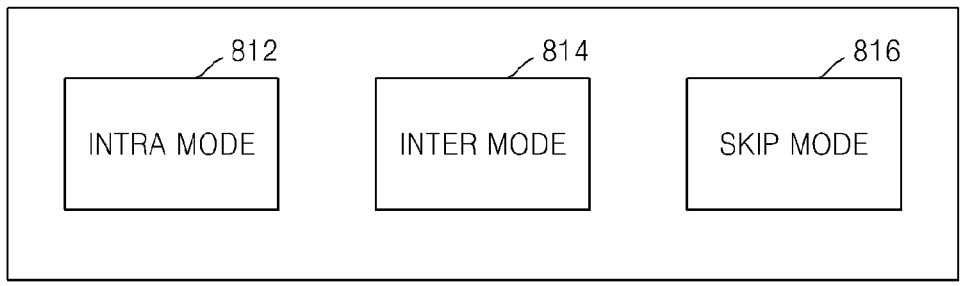
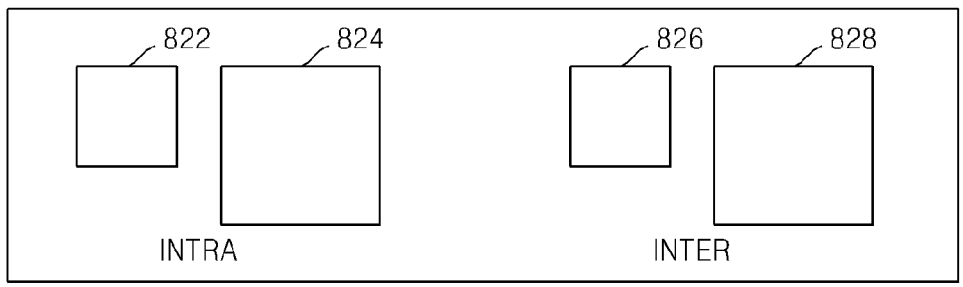

CODING UNITS (1010)

METHOD AND APPARATUS FOR ENCODING VIDEO BY USING DYNAMIC-RANGE TRANSFORMATION, AND METHOD AND APPARATUS FOR DECODING VIDEO BY USING DYNAMIC-RANGE TRANSFORMATION

CROSS-REFERENCE TO RELATED APPLICATIONS

This application claims priority from Korean Patent Application No. 10-2010-0031142, filed on Apr. 5, 2010 in the Korean Intellectual Property Office, and Korean Patent Application No. 10-2010-0056194, filed on Jun. 14, 2010 in the Korean Intellectual Property Office, the disclosures of which are incorporated herein in their entireties by reference.

BACKGROUND

1. Field

Apparatuses and methods consistent with exemplary embodiments relate to encoding and decoding a video.

2. Description of the Related Art

As hardware for reproducing and storing high resolution or high quality video content is being developed and supplied, a need for a video codec for effectively encoding or decoding the high resolution or high quality video content is increasing. In a related art video codec, a video is encoded according to a limited encoding method based on a macroblock having a predetermined size.

A digital video capturing device acquires video data having a pixel value based on a fixed bit-depth. A method of temporarily expanding a bit-depth of a pixel value is used to improve accuracy of operations from among encoding and decoding processes.

SUMMARY

Aspects of one or more exemplary embodiments relate to encoding and decoding of a video in which dynamic range is transformed based on content.

According to an aspect of an exemplary embodiment, there is provided a method of encoding a video by using dynamic range transformation based on content, the method including: performing inter prediction, through motion compensation, and intra prediction for a current region using image data, in which a dynamic range of the current region is transformed based on content of input video; performing transformation on residual data generated by the intra prediction and the inter prediction and performing quantization on a transformation coefficient generated by the transformation; and performing entropy encoding on the quantized transformation coefficient and outputting a bitstream including encoded data for the current region.

In the performing of the intra prediction and the inter prediction, the intra prediction and the inter prediction may be performed by using image data, in which a dynamic range is transformed so that pixel values of the current region are expanded in a range of a maximum limit value through a minimum limit value which may be represented as current bit depths of the pixel values.

In the performing of the intra prediction and the inter prediction, a value higher than the highest limit value from among the pixel values of the current picture may be transformed to correspond to the maximum limit value, a value less than the lowest limit value from among the pixel values of the current picture may be transformed to correspond to the minimum limit value, and pixel values between the highest limit value and the lowest limit value from among the pixel values of the current picture may be transformed to correspond one to one with values between the maximum limit value and the minimum limit value.

The highest limit value and the lowest limit value may be the largest value and the smallest value, respectively, from among the pixel values of the current region.

In the performing of the intra prediction and the inter prediction, pixel values obtained by dividing a value obtained by multiplying 'a difference between a current pixel value and the lowest limit value' and 'a difference between the maximum limit value and the minimum limit value' by 'a difference between the highest limit value and the lowest limit value' may correspond one to one with the pixel values between the highest limit value and the lowest limit value.

The pixel values that correspond one to one with the pixel values between the highest limit value and the lowest limit value may be output by using a bit shift operation using current bit depths.

The current bit depths may be bit depths that are internally expanded during encoding and decoding of the video.

The current bit depths may be the sum total of a first bit depth for dynamic range expansion and a second bit depth that is internally expanded.

The performing of the intra prediction and the inter prediction may include: expanding a bit depth of a pixel value of the video by the second bit depth; expanding a dynamic range of intermediate data of the bit depth expanded by the second bit depth, by the first bit depth; and performing the intra prediction and the inter prediction on data in which the dynamic range is expanded.

In the expanding of the dynamic range, a value higher than the highest limit value from the intermediate data may be transformed to correspond to the maximum limit value, a value less than the lowest limit value from among the pixel values of the current picture may be transformed to correspond to the minimum limit value, and data between the highest limit value and the lowest limit value from the intermediate data may be transformed to correspond one to one with values between the maximum limit value and the minimum limit value.

In the expanding of the dynamic range, the pixel values that correspond one to one with the pixel values between the highest limit value and the lowest limit value may be output by a bit shift operation using the first bit depth and the second bit depth.

In the performing of the intra prediction and the inter prediction, the pixel values of the current region perform the intra prediction and the inter prediction by using the image data, in which the dynamic range may be transformed according to a luma component and chroma components.

The pixel values between the highest limit value and the lowest limit value from among the pixel values of the current region may be transformed to correspond one to one with values between the maximum limit value and the minimum limit value according to a non-linear function relationship.

The pixel values between the highest limit value and the lowest limit value from among the pixel values of the current region may be split into a predetermined number of sections, the pixel values for each section may be determined as corresponding result values according to a function that linearly increases in each section, and the result values in successive sections from among the sections may continue so that the result values for the pixel values in all sections may correspond one to one with the values between the maximum limit value and the minimum limit value.

A current pixel value that is higher than the highest limit value or less than the lowest limit value may be truncated.

The highest limit value and the lowest limit value may be determined according to one of data units from among an image sequence of the input video, a frame, a frame set for intra prediction, a region, and a coding unit.

The method may further include encoding information about dynamic range transformation and transmitting the encoded information.

The information about dynamic range transformation may include information about the highest limit value and the lowest limit value of content of the input video.

The information about dynamic range transformation may include information about a value obtained by excluding the highest limit value from the difference between the lowest limit value of content of the input video, the maximum limit value of a pixel value, and the minimum limit value of a pixel value.

In the performing of the intra prediction and the inter prediction, the intra prediction and the inter prediction may be performed for at least one deeper coding unit according to regions reduced by hierachically splitting maximum coding units as a depth deepens with respect to each maximum coding unit split from the current region into coding units having predetermined maximum sizes, in the performing of the transformation and the quantization, the transformation and the quantization may be performed in at least one deeper coding unit according to the regions with respect to each maximum coding unit, the method may further include determining an encoding mode for the coding unit of the coded depth including information about at least one coded depth that generates the least encoding error in an original image of the picture, and in the performing of the entropy encoding, entropy encoding may be performed on the encoded image data which is an encoding result according to the determined coded depth and encoding mode, and thus information about the determined coded depth and encoding mode and a bitstream including the encoded image data may be output.

According to an aspect of another exemplary embodiment, there is provided a method of decoding a video by using dynamic range transformation based on content, the method including: extracting encoded data of a current region of original video by parsing a received bitstream; restoring data symbols by performing entropy decoding on the extracted encoded data; restoring residual data for the current region by performing inverse quantization and inverse transformation on the restored data symbols and restoring image data by performing intra prediction and motion compensation on the restored residual data; and restoring the current region by performing deblocking filtering on the restored image data and restoring a transformed dynamic range of the current region based on content of the original video.

In the restoring of the current region, restored pixel values expanded in a range of the maximum limit value through the minimum limit value which may be represented as current bit depths of the pixel values may be restored to a dynamic range of the current region.

In the restoring of the current region, the maximum limit value and the minimum limit value from among the restored image data may be restored to correspond to the highest limit value and the lowest limit value, respectively, from among the pixel values of the current region, and values between the maximum limit value and the minimum limit value from among the restored image data may be transformed to correspond one to one with values between the highest limit value and the lowest limit value.

In the restoring of the current region, pixel values obtained by adding the lowest limit value to a value obtained by dividing a value obtained by multiplying the current restored data value and the difference between the highest limit value and the lowest limit value, by the difference between the maximum limit value and the minimum limit value, so as to correspond one to one with values between the maximum limit value and the minimum limit value.

The pixel values that correspond one to one with the values between the highest limit value and the lowest limit value may be output by a bit shift operation using current bit depths.

The current bit depths may be bit depths that are internally expanded during encoding and decoding of the video.

The restoring of the current region may include: restoring a dynamic range of the restored image data expanded by the first bit depth; and restoring a bit depth of a pixel value of the current region by reducing a bit depth of intermediate data generated by restoring the dynamic range by the second bit depth.

The restoring of the dynamic range may include: restoring the maximum limit value and the minimum limit value from among the restored image data to correspond to the highest limit value and the lowest limit value of the intermediate data, respectively; and transforming values between the maximum limit value and the minimum limit value from among the restored image data to correspond one to one with values between the highest limit value and the lowest limit value of the intermediate data and generating the intermediate data.

In the generating of the intermediate data, the pixel values that correspond one to one with the pixel values between the highest limit value and the lowest limit value of the intermediate data may be output by a bit shift operation using the first bit depth and the second bit depth.

In the restoring of the current region, the pixel values of the current region may be restored by restoring a dynamic range according to a luma component and chroma components with respect to the restored image data.

The values between the maximum limit value and the minimum limit value from among the restored image data may be transformed to correspond one to one with values between the highest limit value and the lowest limit value according to a non-linear function relationship.

When the pixel values between the maximum limit value and the minimum limit value from among the restored image data are split into a predetermined number of sections, the data for each section may be determined as corresponding pixel values according to a function that linearly increases in each section, and the pixel values corresponding to the data in successive sections from among the sections continue so that the pixel values for the data in all sections may correspond one to one with the values between the highest limit value and the lowest limit value.

The method may further include receiving information about the original video for dynamic range transformation of the current region.

In the restoring of the data symbols, a picture from an input image sequence may be split into coding units having predetermined maximum sizes during encoding of the received bitstream, encoding may be performed for at least one deeper coding unit according to regions reduced by hierachically splitting maximum coding units as a depth deepens with respect to each maximum coding unit, information about an encoding mode for the coding unit of the coded depth including information about the at least one coded depth that generates the least amount of encoding errors in an original image of the picture may be further extracted from the bitstream, and in the restoring of the image data, the encoded image data may be decoded by performing inverse quantization, inverse transformation, intra prediction, and motion compensation based on the coded depth and an encoding mode, based on the information about the encoding mode.

According to an aspect of another exemplary embodiment, there is provided an apparatus for encoding a video by using dynamic range transformation based on content, the apparatus including: an intra predictor which performs intra prediction for a current region using image data, in which a dynamic range of the current region is transformed based on content of input video; an inter predictor which performs inter prediction through motion estimation for the current region using the image data, in which the dynamic range of the current region is transformed; a transformer which performs transformation on residual data generated by the intra prediction and the inter prediction; a quantizer which performs quantization on a transformation coefficient generated by the transformation; an entropy encoder which performs entropy encoding on the quantized transformation coefficient; and an output unit which outputs a bitstream including encoded data for the current region generated by the entropy encoding.

According to an aspect of another exemplary embodiment, there is provided an apparatus for decoding a video by using dynamic range transformation based on content, the apparatus including: a parser which extracts encoded data of a current region of original video by parsing a received bitstream; an entropy decoder which restores data symbols by performing entropy decoding on the extracted encoded data; an inverse quantization and inverse transformer which restore residual data for the current region by performing inverse quantization and inverse transformation on the restored data symbols; an intra predictor which performs intra prediction on the restored residual data; a motion compensator which performs motion compensation on the restored residual data; and an image restoring unit which restores the current region by performing deblocking filtering on the image data restored by the intra prediction and the motion compensation and restoring a transformed dynamic range based on content of the original video.

According to an aspect of another exemplary embodiment, there is provided a computer readable recording medium having embodied thereon a computer program for executing the method of encoding a video by using dynamic range transformation based on content.

According to an aspect of another exemplary embodiment, there is provided a computer readable recording medium having embodied thereon a computer program for executing the method of decoding a video by using dynamic range transformation based on content.

BRIEF DESCRIPTION OF THE DRAWINGS

The above and other features and advantages of exemplary embodiments will become more apparent by describing in detail exemplary embodiments with reference to the attached drawings in which:

FIG. 14 is a diagram for describing a relationship between a coding unit and transformation units, according to an exemplary embodiment;

FIG. 15 is a diagram for describing encoding information of coding units corresponding to a coded depth, according to an exemplary embodiment;

DETAILED DESCRIPTION OF EXEMPLARY EMBODIMENTS

Hereinafter, a method and apparatus for encoding video by using dynamic range transformation based on content, and a method and apparatus for decoding video by using dynamic range transformation based on content will be described in detail with reference to FIGS. 1 through 23. More specifically, encoding and decoding of a video by using dynamic range transformation based on content according to exemplary embodiments will be described with reference to FIGS. 1 through 7 and encoding and decoding of a video by using dynamic range transformation based on content, based on a coding unit according to a tree structure, according to exemplary embodiments will be described with reference to FIGS. 8 through 23.

Figure 1:
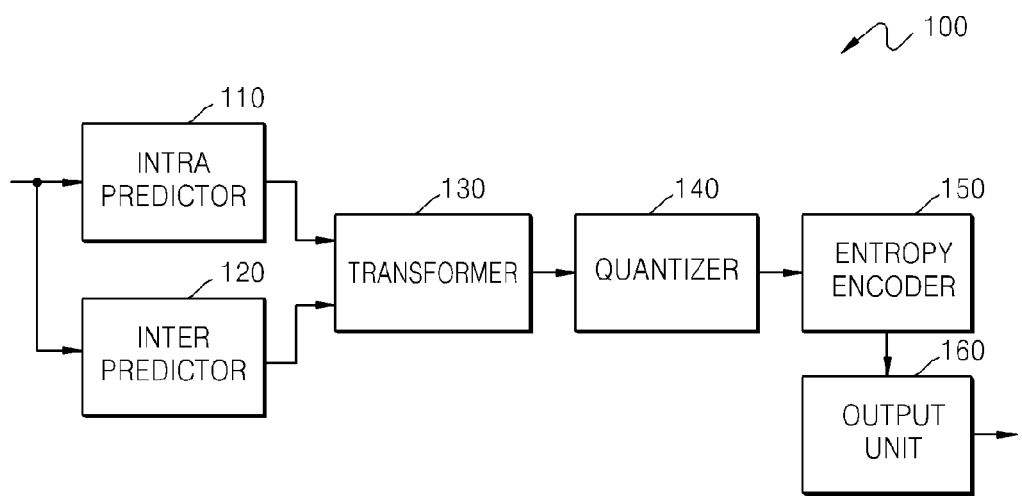
FIG. 1 is a block diagram of an apparatus for encoding a video by using dynamic range transformation based on content, according to an exemplary embodiment.

FIG. 1 is a block diagram of an apparatus 100 for encoding a video by using dynamic range transformation based on content, according to an exemplary embodiment.

The apparatus 100 for encoding a video by using dynamic range transformation based on content according to the current exemplary embodiment includes an intra predictor 110, an inter predictor 120, a transformer 130, a quantizer 140, an entropy encoder 150, and an output unit 160.

The intra predictor 110 performs intra prediction on image data, in which a dynamic range of a current region is transformed based on content of input video, and the inter predictor 120 performs inter prediction including motion estimation on image data, in which the dynamic range of a current region is transformed. A region of a video or an image may refer to a part of the video or the image, for example, a frame, a slice, a coding unit, etc. A dynamic range of a current region may be transformed based on content of one or more images of input video.

The apparatus 100 for encoding a video, which uses dynamic range transformation based on content, may expand a dynamic range of pixel values of the current region in a maximum range from a minimum limit value through a maximum limit value capable of being expressed as current bit depths of the pixel values. In this regard, the apparatus 100 for encoding a video, which uses dynamic range transformation based on content, transforms the current region so that the dynamic range of the pixel values may be expanded to the maximum range, and encodes the transformed current region.

The intra predictor 110 and the inter predictor 120 may perform intra prediction and inter prediction, respectively, by using image data, in which the dynamic range is transformed, and thus may output residual data.

Hereinafter, a high value and a low value from among pixel values of an original image set to determine a substantial dynamic range of a current region are referred to as a highest limit value and a lowest limit value, respectively. Also, the maximum value and the minimum value from among pixel values represented as predetermined bit depths are referred to as a maximum limit value and a minimum limit value.

According to exemplary embodiments, a dynamic range is expanded so that pixel values between the highest limit value and the lowest limit value of an original image of input video may correspond to values between the minimum limit value and the maximum limit value which may be represented as predetermined bit depths. Thus, the dynamic range may be expanded based on content of the input video or an original image of the input video.

The intra predictor 110 and the inter predictor 120 may transform a value that is higher than the highest limit value from among pixel values of a current region so as to correspond to the maximum limit value and transform a value that is less than the lowest limit value from among pixel values of a current region so as to correspond to the minimum limit value. Also, pixel values between the highest limit value and the lowest limit value from among the pixel values of the current region may be transformed so as to correspond one to one with values between the maximum limit value and the minimum limit value.

The intra predictor 110 and the inter predictor 120 may determine the highest limit value and the lowest limit value as the highest value and the lowest value, respectively, from among the pixel values of the current region. Here, if there is no pixel larger than a current pixel value in a corresponding section, the current pixel value is defined as the highest value and if there is no pixel less than a current pixel value, the current pixel value is defined as the lowest value.

For example, the intra predictor 110 and the inter predictor 120 may correspond 'pixel values between the highest limit value and the lowest limit value' one to one with a value obtained by dividing a value obtained by multiplying 'a difference between a current pixel value and the lowest limit value' and 'a difference between the maximum limit value and the minimum limit value,' by 'a difference between the highest limit value and the lowest limit value'.

According to dynamic range transformation according to an exemplary embodiment, a current pixel value that is higher than the highest limit value or less than the lowest limit value from among the current region may be truncated.

In order to improve operation speed, the intra predictor 110 and the inter predictor 120 may determine pixel values that correspond one to one with the pixel values between the highest limit value and the lowest limit value by a bit shift operation using a current bit depth.

The apparatus 100 for encoding a video that uses dynamic range transformation based on content may internally expand and use a bit depth of an image pixel value during encoding and decoding of an input video. As the bit depth of a pixel value is expanded, a maximum range of the pixel value may be expanded.

When the intra predictor 110 and the inter predictor 120 may perform intra prediction and inter prediction, respectively, for a current region by using image data based on an internally expanded bit depth, intra prediction and inter prediction for the current region may be performed by using image data of the current region transformed to expand a dynamic range of a pixel value to a maximum range based on the expanded bit depth.

For example, when an increasing amount of a bit depth according to expansion of a dynamic range is a first bit depth and an internally expanded bit depth is a second bit depth, the dynamic range may be expanded to a maximum range of a pixel value based on the sum total of the first bit depth and the second bit depth. In this regard, the operation of expanding a bit depth of a pixel value of a video by the second bit depth and the operation of expanding a dynamic range by the first bit depth with respect to intermediate data of a bit depth expanded by the second depth may be sequentially performed.

The intra predictor 110 and the inter predictor 120 may determine the highest limit value and the lowest limit value according to a predetermined data unit such as an image sequence of an input video, a frame, a frame set for intra prediction, a region, and a coding unit and thus a dynamic range may be transformed based on content in the predetermined data unit of the input video or the original image of the input video.

The pixel values between the highest limit value and the lowest limit value from among the pixel values of the current region may be transformed to correspond one to one with values between the maximum limit value and the minimum limit value according to a linear function relationship or a non-linear function relationship.

If intra prediction or inter prediction is currently performed by dynamic range adaptation with highest and lowest limits different from highest and lowest limits of reference region, then a dynamic range of the reference region may be transformed as to be same as the highest and lowest limit of the current region.

The intra predictor 110 and the inter predictor 120 may perform intra prediction and inter prediction, respectively, on previous regions, in which the dynamic range is transformed based on content of an input video, and thus output residual data for the previous frames.

The residual data for the previous regions may be encoded through transformation and quantization, and the quantized data may be restored as restored regions for the previous regions through inverse quantization, inverse transformation, and in-loop filtering. When the highest limit value and the lowest limit value for dynamic range transformation are set in each frame, the inter predictor 120 may restore a dynamic range of restored regions for the previous frames to an original dynamic range, retransform the dynamic range of restored regions for the previous frames based on a dynamic range of a current region, and then perform inter prediction of the current region by referring to a restored region, in which the dynamic range is transformed to be the same as the current region.

The intra predictor 110 may perform intra prediction by using surrounding region information of a current region, in which a dynamic range is transformed.

The intra predictor 110 and the inter predictor 120 may perform intra prediction and inter prediction, respectively, by using the image data, in which the dynamic range may be transformed according to a luma component and chroma components.

The transformer 130 may perform transformation on the residual data generated by intra prediction and inter prediction and the quantizer 140 performs quantization for a transformation coefficient generated by the transformation. The entropy encoder 150 may perform entropy encoding on a quantized transformation coefficient. The output unit 160 outputs a bitstream including encoded data of a current region generated by entropy encoding.

The output unit 160 may encode information about dynamic range transformation and transmits the encoded information along with encoded data of a current region. For example, the information about dynamic range transformation may be inserted into a sequence parameter of a bit stream including encoded data of the current region or a slice header.

The information about dynamic range transformation may include information about the highest limit value and the lowest limit value of content of an input video or an input image. In order to reduce the total number of bits of the bitstream output from the output unit 160, a value obtained by subtracting the highest limit value from the difference between the maximum limit value and the minimum limit value of a pixel value may be encoded, instead of information about the highest limit value.

The apparatus 100 for encoding a video by using dynamic range transformation based on content according to an exemplary embodiment may use video encoding based on coding units having a tree structure and will be described in detail with reference to FIGS. 8 through 22.

In the apparatus 100 for encoding a video by using dynamic range transformation based on content according to an exemplary embodiment, as a dynamic range of data for an internal operation is expanded during encoding, performance of prediction encoding, transformation, and in-loop filtering may be improved. Also, the highest limit value and the lowest limit value are substantially set by data units and thus a dynamic range may be transformed based on content.

Figure 2:
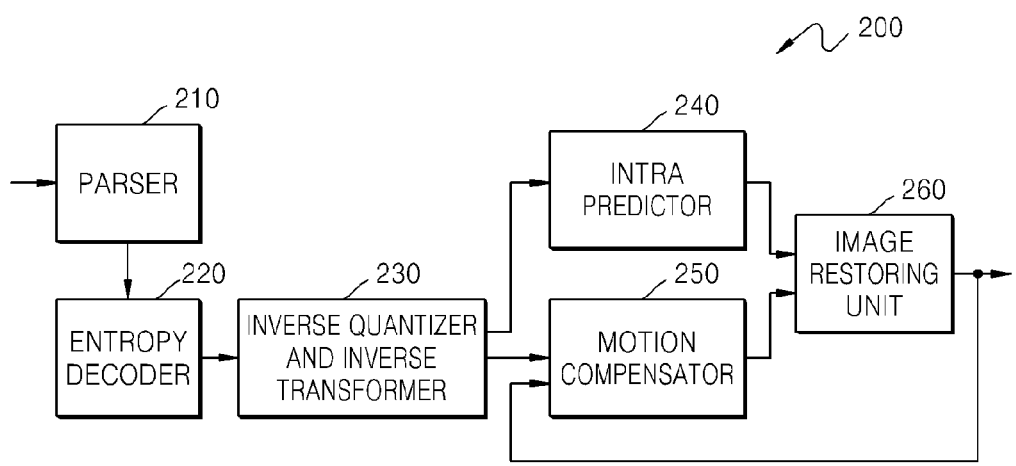
FIG. 2 is a block diagram of an apparatus for decoding a video by using dynamic range transformation based on content, according to an exemplary embodiment.

FIG. 2 is a block diagram of an apparatus 200 for decoding a video by using dynamic range transformation based on content, according to an exemplary embodiment.

The apparatus 200 for decoding a video by using dynamic range transformation based on content according to the current exemplary embodiment includes a parser 210, an entropy decoder 220, an inverse quantizer and inverse transformer 230, an intra predictor 240, a motion compensator 250, an image restoring unit 260.

The parser 210 may parse a received bitstream and extract encoded data of a current region of an original video. A region of a video or an image may refer to a part of the video or the image, for example, a frame, a slice, a coding unit, etc. The entropy decoder 220 may perform entropy decoding on the extracted encoded data and restore data symbol. The inverse quantizer and inverse transformer 230 may perform inverse quantization and inverse transformation on the restored data symbol and restore residual data for a current region. The intra predictor 240 may perform intra prediction on the restored residual data, and the motion compensator 250 may perform motion compensation for the restored residual data by using a motion vector. The motion vector may be extracted by the parser 210 and provided to the motion compensator 250.

The image restoring unit 260 may perform in-loop filtering such as deblocking filtering on image data restored by intra prediction and motion compensation and restore the current region. In particular, if the extracted encoded data is data obtained by encoding image data, in which a dynamic range is internally transformed based on content of original video, the dynamic range may be restored and thus the current region may be restored. A dynamic range of a current region may be restored based on content of one or more images of original video. When the information about dynamic range transformation is extracted by the parser 210, the extracted encoded data may be considered to be data in which a dynamic range is transformed.

A dynamic range of image data restored by in-loop filtering such as deblocking filtering may be expanded in a range between the maximum limit value through the minimum limit value which may be represented as current bit depths of a pixel value. Accordingly, the image restoring unit 260 may restore the dynamic range of the restored image data to a dynamic range of a current region.

In order to restore a dynamic range of a restored region, the image restoring unit 260 may restore the maximum limit value and the minimum limit value from among restored pixel values so as to correspond to the highest limit value and the lowest limit value from among pixel values of a current region, respectively, and may transform values between the maximum limit value and the minimum limit value so as to correspond one to one with values between the highest limit value and the lowest limit value. The highest limit value and the lowest limit value of the current region may be the highest value and the lowest value, respectively, from among pixel values of the current region.

The image restoring unit 260 may inverse transform a dynamic range through an operation for corresponding the values between the maximum limit value and the minimum limit value one to one with values obtained by adding the lowest limit value to a value obtained by dividing a value obtained by multiplying the current restored data value and the 'difference between the 'highest limit value and the lowest limit value,' by the 'difference between the maximum limit value and the minimum limit value.' The image restoring unit 260 may output results of one to one correspondence for dynamic range inverse transformation by using a bit shift operation.

Current bit depths according to an exemplary embodiment may be bit depths internally expanded during video encoding and decoding. In this case, the image restoring unit 260 may restore the internally expanded bit depths to original bit depths. For example, the image restoring unit 260 may perform a first operation for restoring a dynamic range by reducing a dynamic range of the restored image data, in which a dynamic range is expanded by a first bit depth, by the first bit depth. Intermediate data, in which a dynamic range is reduced by a first bit depth from the restored image data, may be generated. Sequentially, the image restoring unit 260 may perform a second operation for restoring a bit depth of intermediate data to a bit depth of a pixel value of an original frame by internally reducing the bit depth of the intermediate data by a second bit depth.

According to an exemplary embodiment, the current region restored by the image restoring unit 260 may include pixel values that have undergone a truncation process in which a current pixel value that is higher than the highest limit value of a corresponding original image or less than the lowest limit value thereof from among the current region may be truncated.

The highest limit value and the lowest limit value of the current region may be determined according to one of data units from among an image sequence of an original video, a frame, a frame set for intra prediction, a region, and a coding unit.

The apparatus 200 for decoding a video by using dynamic range transformation based on content may receive information about dynamic range transformation of the current region.

The received information about dynamic range transformation according to an exemplary embodiment may include information about the highest limit value and the lowest limit value of content of original video or an original image. If information about a value obtained by subtracting the highest limit value from the difference between the maximum limit value and the minimum limit value of a pixel value is included in the received information, the highest limit value may be determined. Also, information about data units used to determine the highest limit value and the lowest limit value of the current region may be received.

The motion compensator 250 may perform motion compensation for the current region by referring to restored regions for previous regions of original video. In this case, when information about dynamic range transformation is set according to frames, a dynamic range of restored regions is retransformed so as to synchronize with the transformed dynamic range of the current region and thus motion compensation of the current region may be performed by referring to the restored regions in which the dynamic range is transformed to be the same as that of the current region.

The apparatus 200 for decoding a video by using dynamic range transformation based on content may use video decoding based on a coding unit having a tree structure and will be described in detail with reference to FIGS. 8 through 22.

According to the apparatus 200 for decoding a video by using dynamic range transformation based on content, data encoded based on an expanded dynamic range for one or more internal operations during encoding may be decoded and original video may be restored.

Figure 3:
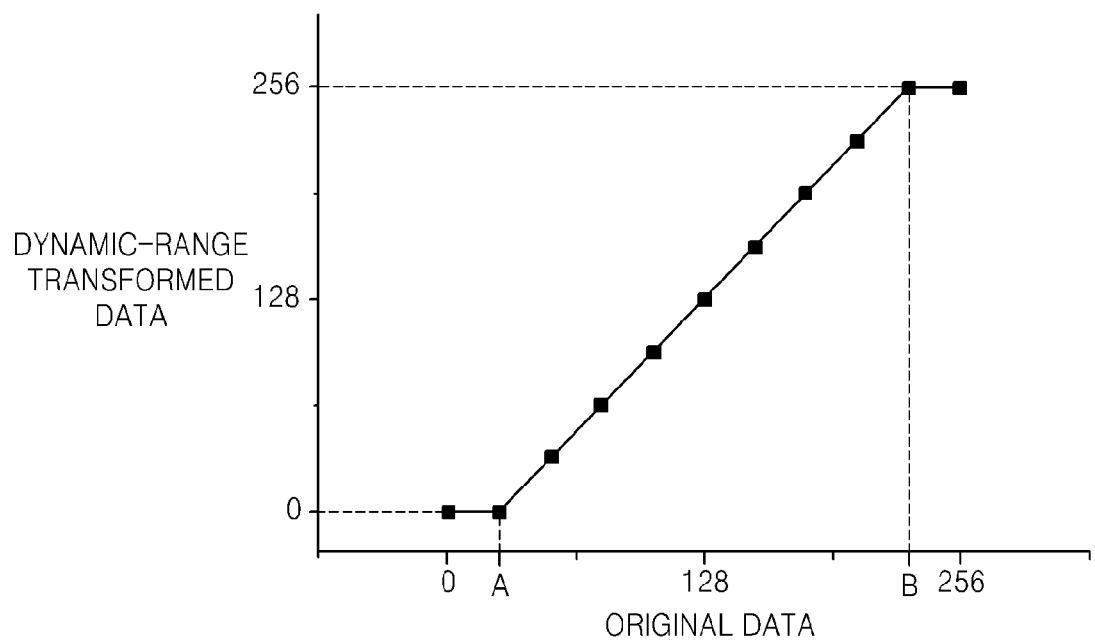
FIG. 3 is a graph illustrating data in which a dynamic range is transformed, according to an exemplary embodiment.

FIG. 3 is a graph illustrating data in which a dynamic range is transformed, according to an exemplary embodiment.

In the graph, a horizontal axis indicates pixel values of original data and a vertical axis indicates pixel values in which a dynamic range is transformed in the apparatus 100 for encoding a video and the apparatus 200 for decoding a video. In FIG. 3, since there is no pixel value higher than a highest limit value, the highest limit value B may be set as the highest value, and since there is no pixel value less than a lowest limit value A, the lowest limit value A may be set as the lowest value. Pixel values of original data are distributed in the section [0, 255], and the intra predictor 110 and the inter predictor 120 may perform intra prediction and inter prediction, respectively, by using data in which a dynamic range of the pixel values of the original data is transformed. In this case, the dynamic range is transformed so that the pixel value of the lowest limit value A may correspond to the minimum limit value 0 according to a current bit depth, the pixel value of the highest limit value B may correspond to the maximum limit value 255 according to a current bit depth, and pixel values between the lowest limit value A and the highest limit value B may correspond one to one with values in the data section (0, 255) between the minimum limit value and the maximum limit value according to current bit depths.

The image restoring unit 260 corresponds a data value 0 to the lowest limit value A of the current region, a data value 244 to the highest limit value B of the current region, and data values between the section (0, 255) to the pixel values between the lowest limit value A and the highest limit value B so that the original dynamic range may be restored.

Figure 4:
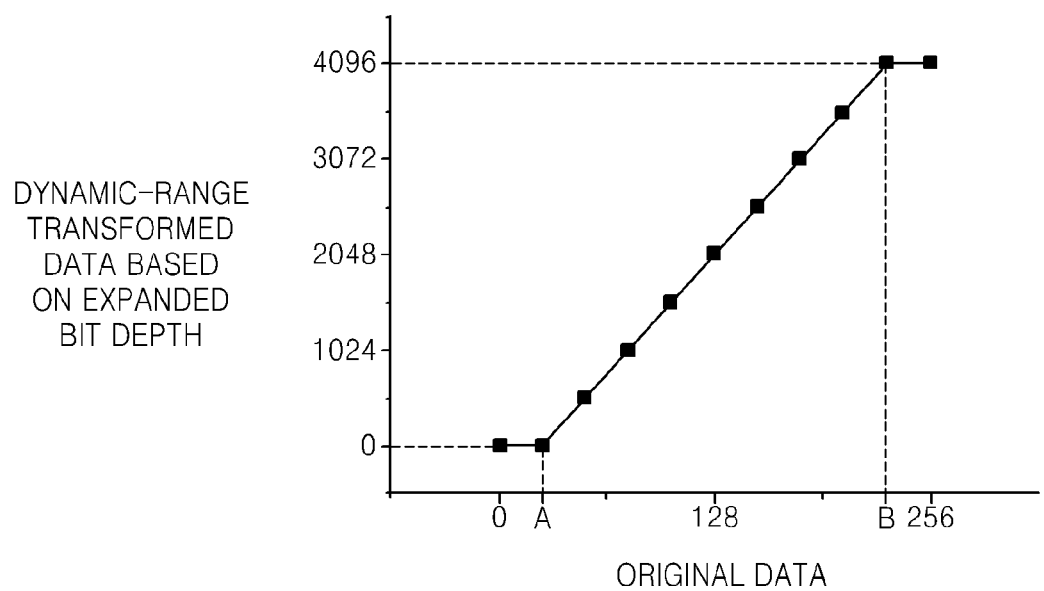
FIG. 4 is a graph illustrating data in which a dynamic range is transformed based on expanded bit depths, according to an exemplary embodiment.

FIG. 4 is a graph illustrating pixel values of data in which a dynamic range is transformed based on expanded bit depths, according to an exemplary embodiment.

In the graph, a horizontal axis indicates pixel values of original data and a vertical axis indicates pixel values of data in which a dynamic range is transformed based on expanded bit depths in the apparatus 100 for encoding a video and the apparatus 200 for decoding a video according to an exemplary embodiment.

The apparatus 100 for encoding a video and the apparatus 200 for decoding a video may perform various processes by using data values transformed by expanding bit depths of pixel values. In this case, the apparatus 100 for encoding a video and the apparatus 200 for decoding a video may perform intra prediction and inter prediction for the current region by using data expanded to the maximum range according to bit depths in which a dynamic range is expanded. Also, the image restoring unit 260 may restore data, in which the dynamic range is transformed, to the dynamic range of the original data. In addition, the image restoring unit 260 may restore a dynamic range along with internally expanded bit depths.

For example, when a bit depth of a pixel value is expanded by 4 bits from 8 bits to 12 bits, the data section may be expanded from [0, 255] to [0, 4095]. In this case, the dynamic range may be transformed so that the pixel value of the lowest limit value A may correspond to the minimum limit value 0 according to the bit depth expanded to 12 bits, the pixel value of the highest limit value B may correspond to the maximum limit value 4095 according to the bit depth expanded to 12 bits, and pixel values between the lowest limit value A and the highest limit value may correspond to values in the data section [0, 4095] according to the bit depth expanded to 12 bits. Accordingly, the intra predictor 110 and the inter predictor 120 may be used in intra prediction and inter prediction, respectively, by using data values in which the dynamic range is transformed based on bit depths expanded by 4 bits.

Also, in this case, the image restoring unit 260 may restore the dynamic range expanded based in the expanded bit depth to an original dynamic range in such a way that the data value 0 corresponds to the lowest limit value A of the current region, the data value 4095 corresponds to the highest limit value B of the current region, and the data values between the section (0, 4095) correspond to the pixel values between the lowest limit value A and the highest limit value B, with respect to the data in which the dynamic range that is expanded to 12 bits is transformed. Also, the bit depth internally expanded to 12 bits may be restored to 8 bits.

Figure 5:
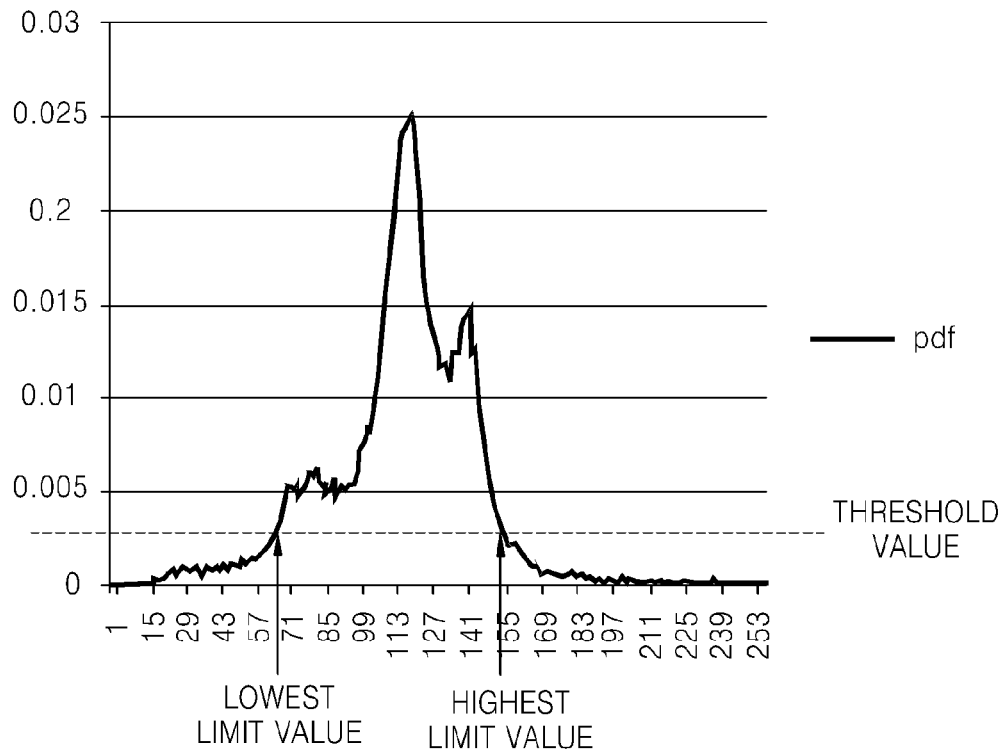
FIG. 5 is a graph illustrating a probability density function (PDF) of a pixel value of original data, according to an exemplary embodiment.

FIG. 5 is a graph illustrating a probability density function (PDF) of a pixel value of original data, according to an exemplary embodiment.

In the graph, a horizontal axis indicates pixel values of original data and a vertical axis indicates the probability density of pixel values of original data. In general, the probability density for pixel values that are less than the lowest limit value and larger than the highest limit value of the original frame is significantly low. In this regard, the intra predictor 110 and the inter predictor 120 may set threshold values for a predetermined probability density and thus set a low value and a high value from among the pixel values of the original frame corresponding to the corresponding threshold values as the lowest limit value and the highest limit value, respectively.

The intra predictor 110 and the inter predictor 120 may truncate pixel values less than the lowest limit value of the original frame and pixel values higher than the highest limit value and perform intra prediction and inter prediction, respectively, for the current region by using data in which the dynamic range of the pixel values between remaining the lowest limit value and the highest limit value is expanded. In determining the dynamic range of the original frame, values higher than the highest limit value and less than the lowest limit value are truncated and thus the difference between the highest limit value and the lowest limit value may be reduced.

Also, in this case, the image restoring unit 260 may restore the expanded dynamic range to an original dynamic range in such a way that the minimum limit value of the data, in which the dynamic range is transformed, corresponds to the lowest limit value A of the current region, the maximum limit value corresponds to the highest limit value B of the current region, and the data values between the minimum limit value and the maximum limit value correspond to the pixel values between the lowest limit value A and the highest limit value B. However, a pixel value smaller than the lowest limit value and larger than the highest limit value may not be restored from among pixel values of an original frame truncated during a dynamic range expanding process.

Accordingly, in case that dynamic range transformation is accompanied with truncation process, as the lowest limit value decreases or the highest limit value increases, the dynamic range is less expanded; however, the pixel value of the original frame may be less damaged during a dynamic range restoring process. Alternatively, as the lowest limit value increases or the highest limit value decreases, the dynamic range is more expanded and thus fine image processing is possible; however, a loss rate of the pixel values of the original frame may increase during the dynamic range restoring process. Accordingly, the apparatus 100 for encoding a video by using dynamic range transformation based on content variably sets the lowest limit value and the highest limit value, if needed, and thus a truncation rate of the pixel values of the original frame may be adjusted, thereby controlling expansibility of the dynamic range and stability of the original pixel.

Hereinafter, the intra predictor 110 and the inter predictor 120 are used in intra prediction and inter prediction, respectively, transformation in dynamic range of the pixel value of the original frame is described according to relational expressions (1) through (5).

In general, a fixed bit depth is used in a video format of a digital video capturing device. In a video format that is widely used, 8 bits are allocated to each pixel according to colors. In the video format having a bit depth of N bits, pixel values are distributed in a section $[0, 2^N-1]$, that is, in a range of 0 to $2^N-1$, so that a section of a pixel value of a video sequence having a bit depth of 8 bits is $[0, 2^8-1]$. In general, a probability that the pixel value of a video sequence is distributed near the center of a pixel value section is high and a probability that the pixel value of a video sequence is distributed near the outside of a pixel value section is very low.

In other words, distribution of pixel values of an original video sequence may be represented by relational expression (1) below:

$$0 \leq OrgMin \leq Org \leq OrgMax \leq 2^N - 1 \qquad (1)$$

An original pixel value Org, a minimum value OrgMin of the original pixel value, and a maximum value OrgMax of the original pixel value are greater than or equal to 0 and are less than $2^N-1$ so that the original pixel value Org may be distributed in a pixel value section narrower than a possible maximum range $2^N-1$.

In dynamic range transformation according to an exemplary embodiment, the maximum value OrgMax of the original pixel value and the maximum value OrgMax of the original pixel value are set to be the lowest limit value and the highest limit value, respectively, based on content, and the highest limit value OrgMax may be replaced with OrgMin+Range by using a difference Range(=OrgMax−OrgMin) between the highest limit value and the lowest limit value. In this case, dynamic range transformation based on content according to an exemplary embodiment may be represented by transformation expressions (2), (3), and (4) below:

$$\text{if}(Org < OrgMin) \; OrgTransformed = 0; \qquad (2)$$

$$\text{else if}(Org > (OrgMin + Range)) \; OrgTransformed = 2^N - 1; \qquad (3)$$

$$\text{else } OrgTransformed = (Org - OrgMin) * (2^N - 1)/Range; \qquad (4)$$

According to transformation expression (2), when the original pixel value Org is less than the lowest limit value OrgMin, data OrgTransformed transformed by dynamic range transformation is determined as 0. According to transformation expression (3), when the original pixel value Org is less than the highest limit value OrgMin+Range, the transformed data OrgTransformed is determined as $2^N-1$. According to transformation expression (4), when the original pixel value Org is larger than the lowest limit value OrgMin and is below the highest limit value OrgMin+Range, the transformed data OrgTransformed may correspond one to one with $(Org-OrgMin)*(2^N-1)/Range$ with respect to the original pixel value Org.

In the dynamic range transformation according to transformation expressions (2), (3), and (4), when the original pixel value Org is larger than or equal to the lowest limit value OrgMin and less than or equal to the highest limit value OrgMin+Range, the original pixel value Org corresponds to the transformed data OrgTransformed according to a linear function of gradient $(2^N-1)/Range$.

The transformation expressions (2), (3), and (4) are only examples for dynamic range transformation based on content according to an exemplary embodiment and the dynamic range transformation according to an exemplary embodiment is not limited to transformation expressions based on a linear function. For example, when the original pixel value Org is less than the lowest limit value OrgMin, the original pixel value Org is transformed to the minimum limit value of an expanded dynamic range. When the original pixel value Org is higher than the highest limit value OrgMin+Range, the original pixel value Org is transformed to the maximum limit value of an expanded dynamic range. When the original pixel value Org is larger than or equal to the lowest limit value OrgMin and less than or equal to the highest limit value OrgMin+Range, and a dynamic range may be transformed as the original pixel value Org increases so that the transformed data OrgTransformed is monotonically increased, transformation expressions may be variably determined as needed. For convenience of description, dynamic range transformation based on content according to an exemplary embodiment will be described later based on exemplary transformation expressions (2), (3), and (4).

Operation speed of the dynamic range transformation based on content may be improved by performing division using a bit shift operation. In order to express transformation expressions using a bit shift operation, an offset OFFSET may be set to $1<<(CADR\_BITS-1)$. A bit depth CADR_BITS for dynamic range transformation based on content may be determined according to one of data units from among an image sequence of an input video, a frame, a frame set for intra prediction, a region, and a coding unit. CADR_BITS for forward and inverse transformation may be different. CADR_BITS values for different color components are not mandatorily the same. Also, a constant $s=(((2^N-1)<<CADR\_BITS)+(Range>>1))/Range$ may be set. Accordingly, as the transformation expression (4) is changed to transformation expression (5) below, a transformation expression by using a bit shift operation may be determined.

$$\text{if}(Org<OrgMin)\ OrgTransformed=0; \quad (2)$$

$$\text{else if}(Org>(OrgMin+Range))\ OrgTransformed=2^N-1; \quad (3)$$

$$\text{else } OrgTransformed=(s*(Org-OrgMin)+OFFSET)>>CADR\_BITS \quad (5)$$

As a result of the dynamic range transformation expressions (2), (3) and (4) (or (5)) based on content, a section of the transformed data OrgTransformed may be transformed to $0 \leq OrgTransformed \leq 2^N-1$. That is, a section [OrgMin, OrgMax] of the original pixel value may be expanded to a section $[0, 2^N-1]$ of the transformed data OrgTransformed.

The intra predictor 110 and the inter predictor 120 of the apparatus 100 for encoding a video by using dynamic range transformation based on content may perform intra prediction and inter prediction, respectively, by using the transformed data OrgTransformed. When the transformed data OrgTransformed is used, distribution of a generated residual increases and thus accuracy of an internal operation may be improved, compared with distribution of a residual generated by intra prediction and inter prediction using the original pixel value Org.

Hereinafter, the image restoring unit 260 according to an exemplary embodiment restores a dynamic range of data restored by decoding to a dynamic range of an original frame and is described according to relational expressions (6) through (7).

The dynamic range of data restored by decoding is inverse transformed and thus the dynamic range of the original frame may be restored. That is, a dynamic range inverse transformation based on content according to transformation expression (6) below is applied to data Rec restored by decoding and thus data RecInvTransformed in which a dynamic range is inverse transformed may be output.

$$RecInvTransformed=Rec*Range/(2^N-1)+OrgMin; \quad (6)$$

Dynamic range transformation expression (6) based on content may be changed to transformation expression (7) below using a bit shift operation.

$$RecInvTransformed=(si*Rec+(OrgMin<<CADR\_BITS)+OFFSET)>>CADR\_BITS \quad (7)$$

Here, a constant si may be set to $si=((Range<<CADR\_BITS)+((2^N-1)>>1))/(2^N-1)$.

When a current sequence follows a YUV color format, dynamic range transformation based on content according to an exemplary embodiment may be performed with respect to luma and chroma components. The dynamic range transformation expressions and inverse transformation expressions described with reference to relational expressions (1) through (7) may be applied with respect to a Y component pixel value as a luma component of a pixel value. Dynamic range transformation expressions and inverse transformation expressions based on content with respect to a U component pixel value and a V component pixel value, respectively, as a chroma component are described with reference to relational expressions (8) through (23) below.

In relational expressions (8) through (17) below, Org_U and Org_V indicate an original U component pixel value and an original V component pixel value, respectively. OrgMin_U and OrgMax_U indicate a minimum value and a maximum value of an original U component pixel value, respectively, and OrgMin_V and OrgMax_V indicate a minimum value and a maximum value of an original V component pixel value, respectively. OrgMin_U and OrgMin_V may be different from each other and OrgMax_U and OrgMax_V may also be different from each other. For convenience of description, it is assumed that OrgMin_U and OrgMax_U are the lowest limit value and the highest limit value of a U component pixel value, respectively, and OrgMin_V and OrgMax_V are the lowest limit value and the highest limit value of a V component pixel value, respectively.

Also, iRange_U indicates a difference (OrgMax_U−OrgMin_U) between the highest limit value OrgMax_U and the lowest limit value OrgMin_U of a U component pixel value and iRange_V indicates a difference (OrgMax_V−OrgMin_V) between the highest limit value OrgMax_V and the lowest limit value OrgMin_V. Dynamic range transformation based on content with respect to a pixel value of a chroma U component may be represented by transformation expressions (8), (9), and (10) below.

$$\text{if}(Org\_U<OrgMin\_U)\ OrgTransformed\_U=0; \quad (8)$$

$$\text{else if}(Org\_U>(OrgMin\_U+iRange\_U))\ OrgTransformed\_U=2^N-1; \quad (9)$$

$$\text{else } OrgTransformed\_U=(Org\_U-OrgMin\_U)*(2^N-1)/iRange\_U; \quad (10)$$

Dynamic range transformation based on content with respect to a pixel value of a chroma V component may be represented by transformation expressions (11), (12), and (13) below.

$$\text{if}(Org\_V<OrgMin\_V)\ OrgTransformed\_V=0; \quad (11)$$

$$\text{else if}(Org\_V>(OrgMin\_V+iRange\_V))\ OrgTransformed\_V=2^N-1; \quad (12)$$

$$\text{else } OrgTransformed\_V=(Org\_V-OrgMin\_V)*(2^N-1)/iRange\_V; \quad (13)$$

In order to improve operation speed of dynamic range transformation based on content and to reduce complexity of operation, divisions of the relational expressions (8) through (10) and (11) through (13) may be performed through a bit shift operation. For example, constants s_U and s_V for a U component and a V component may be previously defined according to relational expressions (14) and (15), respectively.

$$s\_U=(((2^N-1)<<\text{CADR\_BITS})+(i\text{Range}\_U>>1))/ \\ i\text{Range}\_U; \quad (14)$$

$$s\_V=(((2^N-1)<<\text{CADR\_BITS})+(i\text{Range}\_V>>1))/ \\ i\text{Range}\_V; \quad (15)$$

The dynamic range transformation expression (10) based on content with respect to a pixel value of a chroma U component from among (8), (9), and (10) may be changed to relational expression (16) below using the constant s_U and a bit shift operation.

$$\text{if}(\text{Org}\_U<\text{OrgMin}\_U)\ \text{OrgTransformed}\_U=0; \quad (8)$$

$$\text{else if}(\text{Org}\_U>(\text{OrgMin}\_U+i\text{Range}\_U))\ \text{OrgTransformed}\_U=2^N-1; \quad (9)$$

$$\text{else OrgTransformed}\_U=(s\_U^*(\text{Org}\_U-\text{OrgMin}\_U)+\text{OFFSET})>>\text{CADR\_BITS} \quad (16)$$

Similarly, dynamic range transformation expression (13) based on content with respect to a pixel value of a chroma V component from among (11), (12), and (13) may be changed to relational expression (17) below using the constant s_V and a bit shift operation.

$$\text{if}(\text{Org}\_V<\text{OrgMin}\_V)\ \text{OrgTransformed}\_V=0; \quad (11)$$

$$\text{else if}(\text{Org}\_V>(\text{OrgMin}\_V+i\text{Range}\_V))\ \text{OrgTransformed}\_V=2^N-1; \quad (12)$$

$$\text{else OrgTransformed}\_V=(s\_V^*(\text{Org}\_V-\text{OrgMin}\_V)+\text{OFFSET})>>\text{CADR\_BITS} \quad (17)$$

Similar to the dynamic range transformation based on content, inverse transformation may be performed by each chroma component. If it is deemed that the dynamic range inverse transformation expressions (6) and (7) based on content are inverse transformation expressions with respect to a luma component, dynamic range inverse transformation expressions based on content for chroma U component and Y component are described with reference to relational expressions (18) through (23) below.

In relational expressions (18) and (19), a U component pixel value Rec_U and a V component pixel value Rec_V of data restored by decoding are received and a U component pixel value RecInvTransformed_U, in which the dynamic range is inverse transformed, and a V component pixel value RecInvTransformed_V, in which the dynamic range is inverse transformed, may be input.

$$\text{RecInvTransformed}\_U=\text{Rec}\_U^*i\text{Range}\_U/(2^N-1)+\text{OrgMin}\_U; \quad (18)$$

$$\text{RecInvTransformed}\_V=\text{Rec}\_V^*i\text{Range}\_V/(2^N-1)+\text{OrgMin}\_V; \quad (19)$$

The dynamic range transformation inverse expressions (18) and (19) based on content according to an exemplary embodiment may be changed to high-speed expressions (22) and (23) below, respectively, using a bit shift operation. Firstly, constants si_U and si_V for inverse transformation of a U component and a V component, respectively, may be previously defined according to the relational expressions (20) and (21) below, respectively.

$$si\_U=((i\text{Range}\_U<<\text{CADR\_BITS})+((2^N-1)>>1))/ \\ (2^N-1); \quad (20)$$

$$si\_V=((i\text{Range}\_V<<\text{CADR\_BITS})+((2^N-1)>>1))/ \\ (2^N-1); \quad (21)$$

The dynamic range inverse transformation expressions (18) and (19) based on content with respect to pixel values of a chroma U component and a V component may be defined as the relational expressions (22) and (23) below, respectively, using the constants si_U and si_V.

$$\text{RecInvTransformed}\_U=(si\_U^*\text{Rec}\_U+(\text{OrgMin}\_U<<\text{CADR\_BITS})+\text{OFFSET})>>\text{CADR\_BITS} \quad (22)$$

$$\text{RecInvTransformed}\_V=(si\_V^*\text{Rec}\_V+(\text{OrgMin}\_V<<\text{CADR\_BITS})+\text{OFFSET})>>\text{CADR\_BITS} \quad (23)$$

Similar to the dynamic range transformation and inverse transformation based on content with respect to a luma component, ranges iRange_U and iRange_V between the highest limit value and the lowest limit value of a pixel value of a chroma component may be determined according to one of data units from among an image sequence of an input video, a frame, a frame set for intra prediction, a region, and a coding unit.

In the dynamic range transformation based on content with respect to chroma components, a truncation process may be additionally performed for accuracy improvement. Most pixel values of a chroma component are centralized on a narrower band than that of a luma component so that a dynamic range may be efficiently expanded according to the dynamic range transformation based on content according to an exemplary embodiment and thus accurate prediction encoding may be performed.

As described above with reference to FIG. 4, the apparatus 100 for encoding a video and the apparatus 200 for decoding a video may perform various processes by using data, in which a dynamic range is transformed based on content, with respect to data, in which a bit depth of a pixel value is internally expanded. In this case, the intra predictor 110 and the inter predictor 120 may perform intra prediction and inter prediction, respectively, for a current region by using data, in which a dynamic range is internally expanded based on the expanded bit depth and content.

Also, the image restoring unit 260 may restore data, in which a bit depth is internally expanded by inverse transforming a dynamic range of decoded data, and restore data of an expanded bit depth to data of an original dynamic range by inverse transforming the data of an expanded bit depth. Also, a dynamic range of decoded data and the internally expanded bit depth are inverse transformed at the same time and thus video data of the original dynamic range may be restored.

Hereinafter, dynamic range transformation and inverse transformation based on content in consideration of an internally expanded bit depth will be described.

Dynamic range transformation based on content in consideration of an internally expanded bit depth may include internal expansion of a bit depth and dynamic range transformation based on content. In this case, a total bit depth of N bits after transformation may be determined as the sum of BitDepth for dynamic range transformation based on content according to relational expression (24) below and an expanded bit increment BitIncrement.

$$N\text{bits}=\text{BitDepth}+\text{BitIncrement} \quad (24)$$

Firstly, the expanded bit depth is applied to the original pixel value Org and thus data, in which a bit depth is internally expanded, may be output according to relational expression (25) below.

$$\text{Org}=\text{Org}<<\text{BitIncrement} \quad (25)$$

The result Org according to the relational expression (25) is data of an internally expanded bit depth and thus both the highest limit value OrgMax and the lowest limit value OrgMin may be determined in a range of data of an internally expanded bit depth.

Result data, in which a dynamic range of a pixel value having an internally expanded bit depth is expanded, may be determined according to relational expression (26) below:

$$\text{OrgTranformed}=(\text{Org}-\text{OrgMin})*(2^{BitDepth+BitIncrement}-1)/(\text{OrgMax}-\text{OrgMin})\approx(\text{Org}-\text{OrgMin})*2^{BitIncrement}*2^{BitDepth}/(\text{OrgMax}-\text{OrgMin}+1) \quad (26)$$

A constant RangeFast below is defined according to relational expression (27) below:

$$\text{RangeFast}=\text{OrgMax}-\text{OrgMin}+1 \quad (27)$$

The relational expression (26) from among relational expressions (25) and (26) for dynamic range transformation based on content in consideration of an internally expanded bit depth may be changed to relational expression (28) below by using a bit shift operation.

$$\text{Org}=\text{Org}<<\text{BitIncrement} \quad (25)$$

$$\text{OrgTranformed}=(((\text{Org}-\text{OrgMin})<<\text{BitIncrement})<<\text{BitDepth})/\text{RangeFast} \quad (28)$$

As above, internal expansion of a bit depth according to the relational expression (25) and dynamic range transformation based on content according to the relational expression (26) or (28) are performed so that dynamic range transformation based on content in consideration of an internally expanded bit depth may be performed.

Inverse transformation for restoring a dynamic range and an internally expanded bit depth with respect to data, in which a dynamic range is transformed based on content in consideration of an internally expanded bit depth, may include inverse transformation (restoration) of a dynamic range and restoration of an internally expanded bit depth.

Firstly, inverse transformation of a dynamic range may be represented by relational expression (29) below:

$$\text{RecInvTransformed}=((\text{Rec}*\text{RangeFast}+\text{CADR\_OFFSET})>>\text{BitDepth})+(\text{OrgMin}<<\text{BitIncrement}); \quad (29)$$

Here, a constant CADR_OFFSET may be defined according to relational expression (30) below:

$$\text{CADR\_OFFSET}=(1<<(\text{BitDepth}-1)) \quad (30)$$

Data RecInvTransformed of the restored dynamic range output according to the relational expression (29) is data of an internally expanded bit depth. Accordingly, the bit depth may be restored to an original bit depth according to relational expression (31) below:

$$\text{Rec}=(\text{RecInvTransformed}+(1<<(\text{BitIncrement}-1)))>>\text{BitIncrement} \quad (31)$$

Output data Rec according to relational expression (31) may be video data of the restored dynamic range.

When a bit depth is not internally expanded, a variable BitIncrement is set to 0 in the relational expressions (24) through (31), and the relational expression (25) and the relational expression (31) may be omitted during transformation and inverse transformation, respectively.

According to dynamic range transformation and inverse transformation based on content in consideration of an internally expanded bit depth in the relational expressions (24) through (31), original data may be lost; however, dynamic range transformation and inverse transformation according to the relational expressions (24) through (31) may be useful in terms of achieving a high-speed operation of dynamic range transformation and inverse transformation.

The dynamic range transformation expressions (25) through (28) and the inverse transformation expressions (29) through (31) based on content in consideration of an internally expanded bit depth are exemplary relational expressions for the original pixel value Org and the restored pixel value Rec of a luma component. Dynamic range transformation and inverse transformation based on content in consideration of an internally expanded bit depth for video data of a chroma component may be performed.

In dynamic range transformation based on content in consideration of an internally expanded bit depth for a chroma component, most data of a chroma component is centralized in a narrow band near an offset CADR_OFFSET(=1<<(BitDepth−1)). Accordingly, exemplary relational expressions for dynamic range transformation based on content in consideration of an internally expanded bit depth for chroma component U component and V component may be represented by relational expressions (32) and (33) below for internal expansion of a bit depth and relational expressions (34) and (35) below for dynamic range transformation based on content.

$$\text{Org\_}U=\text{Org\_}U<<\text{BitIncrement} \quad (32)$$

$$\text{Org\_}V=\text{Org\_}V<<\text{BitIncrement} \quad (33)$$

$$\text{OrgTranformed\_}U=((\text{Org\_}U+\text{CADR\_OFFSET})<<\text{BitDepth})/\text{RangeFast}+\text{CADR\_OFFSET} \quad (34)$$

$$\text{OrgTranformed\_}V=((\text{Org\_}V+\text{CADR\_OFFSET})<<\text{BitDepth})/\text{RangeFast}+\text{CADR\_OFFSET} \quad (35)$$

In relational expressions (34) and (35), a constant RangeFast may be directly used as a constant RangeFast of the relational expressions (27) and (28) from among dynamic range transformation for a luma component. Accordingly, additional overhead for a chroma component may be minimized.

Exemplary relational expressions for inverse transformation for restoring a dynamic range and an internally expanded bit for a chroma U component and a chroma V component, respectively, according to the relational expressions (32) through (35) may be represented by relational expressions (36) and (37) below for dynamic range inverse transformation based on content and relational expressions (38) and (39) below for restoring the internally expanded bit.

$$\text{RecInvTransformed\_}U=(((\text{Rec\_}U-(\text{CADR\_OFFSET}<<\text{BitIncrement}))*\text{RangeFast})>>\text{BitDepth})+(\text{CADR\_OFFSET}<<\text{BitIncrement}) \quad (36)$$

$$\text{RecInvTransformed\_}V=(((\text{Rec\_}V-(\text{CADR\_OFFSET}<<\text{BitIncrement}))*\text{RangeFast})>>\text{BitDepth})+(\text{CADR\_OFFSET}<<\text{BitIncrement}) \quad (37)$$

$$\text{Rec\_}U=(\text{RecInvTransformed\_}U+(1<<(\text{Bit\_Increment}-1)))>>\text{Bit\_Increment} \quad (38)$$

$$\text{Rec\_}V=(\text{RecInvTransformed\_}V+(1<<(\text{Bit\_Increment}-1)))>>\text{Bit\_Increment} \quad (39)$$

Accordingly, a bit depth is internally expanded and a dynamic range is maximized based on content with respect to a chroma component centralized in a narrow band and thus accurate prediction on data of a chroma component may be possible during video decoding. Also, data predicted based on the maximized dynamic range is used during video decoding and thus video data may be accurately restored.

Figure 23:
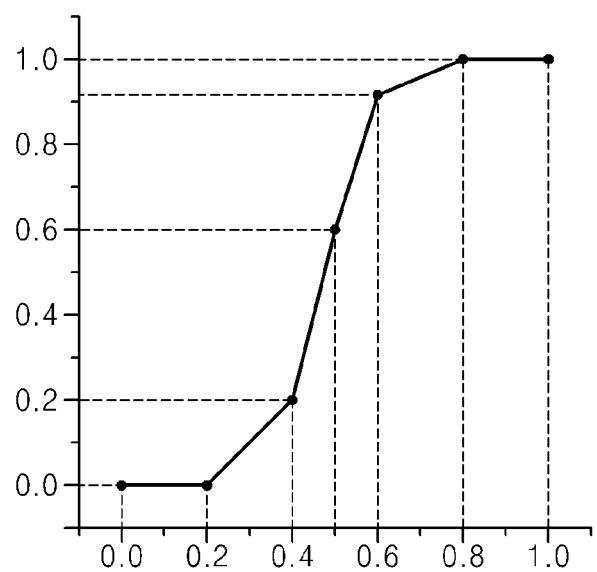
FIG. 23 is a graph illustrating data in which a dynamic range is transformed based on a non-linear function according to an exemplary embodiment.

FIG. 23 is a graph illustrating data in which a dynamic range is transformed based on a non-linear function.

As described above, dynamic range transformation according to an exemplary embodiment is not limited to mapping relations based on a linear function and thus a non-linear function may be used. When a non-linear function is used, accuracy is improved; however, operational load may be increased and a rate-distortion cost may be increased.

Also, as illustrated in FIG. 23, mapping relations based on linear functions in each section and piece-wise linear functions in successive sections may be used. In FIG. 23, a horizontal axis of a non-linear function indicates current pixel values with respect to a maximum pixel value of an input pixel and a vertical axis indicates a current value with respect to a maximum value of transformed data. When a non-linear function is near to a cumulative distribution function of an original pixel value, dynamic range transformation may be efficiently performed. Also, as a slope in each section is uniform so that a rate-distortion cost in each section may be determined, accuracy may be improved, and operational load may be reduced.

Figure 6:
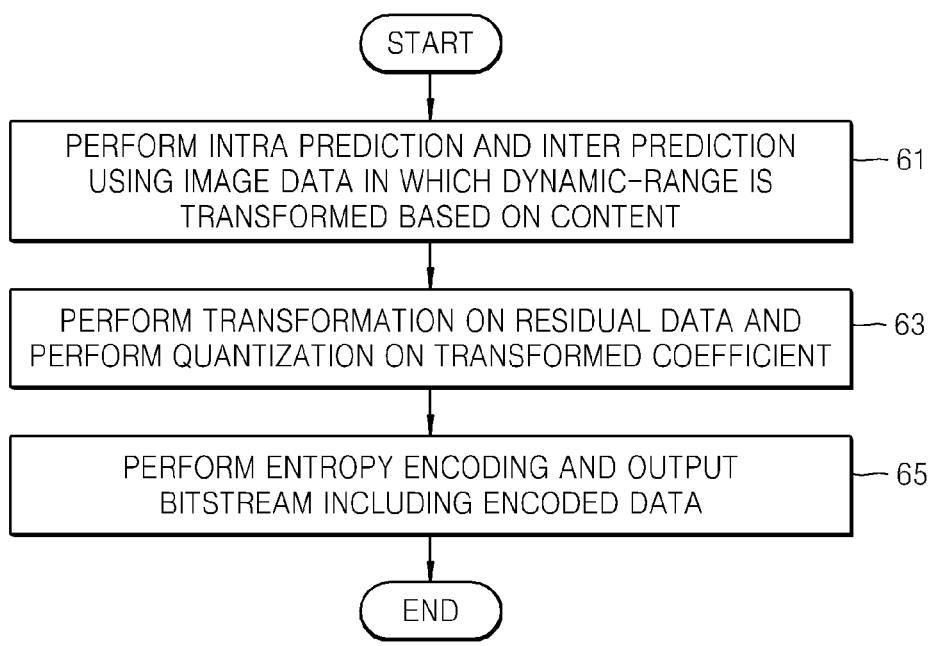
FIG. 6 is a flowchart illustrating a method of encoding a video by using dynamic range transformation based on content, according to an exemplary embodiment.

FIG. 6 is a flowchart illustrating a method of encoding a video by using dynamic range transformation based on content, according to an exemplary embodiment.

In operation 61, intra prediction and inter prediction according to frames of an input video sequence are performed. Here, intra prediction and inter prediction for a current region are performed by using image data, in which a dynamic range of the current region is transformed based on input video content.

Intra prediction and inter prediction for a current region may be performed based on image data of a dynamic range transformed to expand pixel values of the current region in a range of the maximum limit value through the minimum limit value which may be represented as current bit depths of the pixel values. For example, a value that is larger than the highest limit value from among the pixel values of the current region is transformed to correspond to the maximum limit value, a value that is less than the lowest limit value from among the pixel values of the current region is transformed to correspond to the minimum limit value, and pixel values between the highest limit value and the lowest limit value may be transformed to correspond one to one with values between the maximum limit value and the minimum limit value.

A pixel value that is larger than the highest limit value or less than the lowest limit value from among the current pixel values may be truncated. The highest limit value and the lowest limit value may be determined according to one of data units from among an image sequence of an input video, a frame, a frame set for intra prediction, a region, and a coding unit.

A current bit depth may be a bit depth internally expanded during video encoding and decoding.

In operation 63, transformation of residual data generated by intra prediction and inter prediction is performed and quantization is performed on a transformed coefficient generated by the transformation.

In operation 65, entropy encoding is performed for the quantized transformation coefficient and a bitstream including encoded data for the current region is output. Also, information about dynamic range transformation is encoded and transmitted. For example, the information about dynamic range transformation may include information about the highest limit value and the lowest limit value of input video content. Also, information about a value obtained by excluding the highest limit value from the difference between the maximum limit value and the minimum limit value of a pixel value is represented, instead of information about the highest limit value, so that bit numbers may be reduced.

Figure 7:
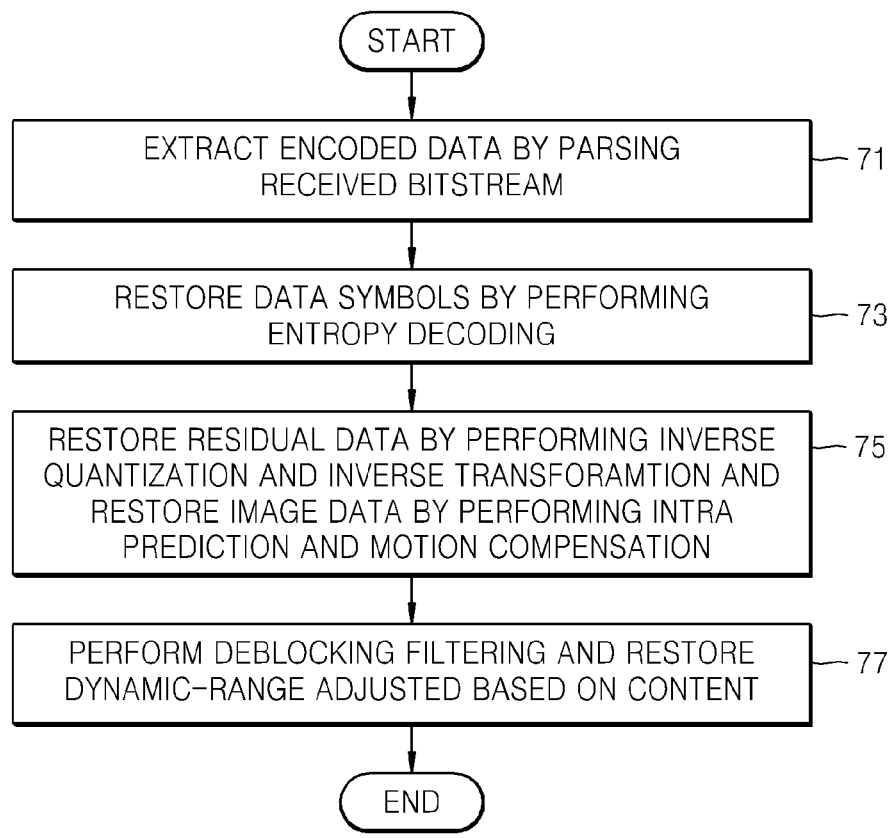
FIG. 7 is a flowchart illustrating a method of decoding a video by using dynamic range transformation based on content, according to an exemplary embodiment.

FIG. 7 is a flowchart illustrating a method of decoding a video by using dynamic range transformation based on content, according to an exemplary embodiment.

In operation 71, a received bitstream is parsed and encoded data of a current region of an original video is extracted from the bitstream. In order to inverse transform to a dynamic range of an original frame, information about the highest limit value and the lowest limit value may be received along with a bitstream for image data.

In operation 73, entropy decoding is performed for extracted encoded data and thus a data symbol is restored.

In operation 75, inverse quantization and transformation are performed for the restored data symbol and thus residual data for a current region is restored. Also, intra prediction and motion compensation are performed for the restored residual data and thus image data is restored.

In operation 77, deblocking filtering for the restored image data is performed and the transformed dynamic range is restored based on content of original video so that the current region is restored. For example, a dynamic range of the restored pixel value expanded in a range of the maximum limit value through minimum limit value, which may be represented as a current bit depth of a pixel value, may be restored to a dynamic range of the current region.

In order to restore the dynamic range of the restored region to the dynamic range of the current region, the maximum limit value and the minimum limit value from among the restored image data may be restored to correspond to the highest limit value and the lowest limit value, respectively, from among pixel values of the current region. Also, values between the maximum limit value and the minimum limit value from among restored image data may be restored to correspond one to one with values between the highest limit value and the lowest limit value.

A bit depth of the restored dynamic range may be restored to a bit depth internally expanded during video encoding and decoding. In this case, the bit depth may be restored to a bit depth of original video.

The highest limit value and the lowest limit value of the dynamic range of an original frame may be determined according to one of data units from among an image sequence of original video, a frame, a frame set for intra prediction, a region, and a coding unit.

According to method and apparatus for encoding video by using dynamic range transformation based on content and method and apparatus for decoding video by using dynamic range transformation based on content, a dynamic range of an input image is expanded and thus image processing such as intra prediction and inter prediction may be precisely performed so that image quality according to encoding and decoding may be improved.

Hereinafter, video encoding and decoding using dynamic range transformation based on content, based on a coding unit according to a tree structure will be described with reference to FIGS. 8 through 22.

Figure 8:
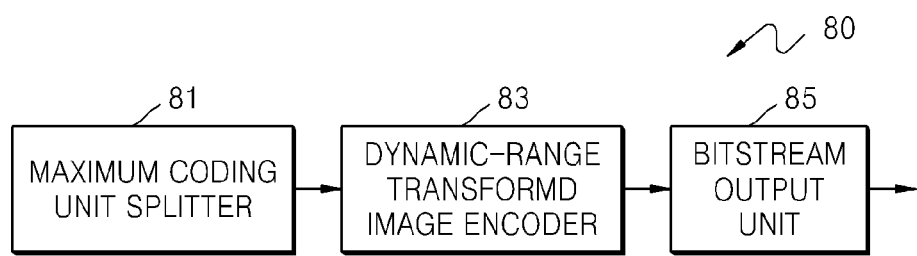
FIG. 8 is a block diagram of an apparatus for encoding a video by using dynamic range transformation based on content, based on a coding unit according to a tree structure, according to an exemplary embodiment.

FIG. 8 is a block diagram of an apparatus 80 for encoding a video by using dynamic range transformation based on content, based on a coding unit according to a tree structure, according to an exemplary embodiment.

The apparatus 80 for encoding a video according to the current exemplary embodiment includes a maximum coding unit splitter 81, a dynamic range transformed image encoder 83, and a bitstream output unit 85.

For convenience of description, the apparatus 80 for encoding a video by using dynamic range transformation based on content, based on a coding unit according to a tree structure may be referred to as a video encoding apparatus 80.

The maximum coding unit splitter 81 may split a current picture based on a maximum coding unit that is a coding unit having the maximum size for the current picture of an image. When the current picture is larger than the maximum coding unit, image data of the current picture may be divided into at least one maximum coding unit. The maximum coding unit according to an exemplary embodiment may be a data unit that the width and height of each square is 2 to the power of a positive integer and may be 32×32, 64×64, 128×128, and 256×256. The image data may be output to the dynamic range transformed image encoder 83 according to at least one maximum coding unit.

The maximum coding unit splitter 81 may split the current picture based on the maximum coding unit that is a coding unit having the maximum size for the current picture of an image. When the current picture is larger than the maximum coding unit, image data of the current picture may be divided into at least one maximum coding unit. A maximum depth and a maximum size of a coding unit, which limit the total number of times a height and a width of the maximum coding unit are hierarchically split, may be predetermined. The image data may be output to the dynamic range transformed image encoder 83 according to at least one maximum coding unit The dynamic range transformed image encoder 83 may perform encoding for each regional and hierarchical coding unit with respect to the maximum coding unit, in which the current picture is split into predetermined coding units having a maximum size. Decoding of each regional and hierachical coding unit denotes decoding of deeper coding units hierachically split as a depth deepens in each region in which the maximum coding unit is split.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

An dynamic range transformed image encoder 83 may encode at least one split region obtained by splitting a region of the maximum coding unit according to depths, and determines a depth to output a finally encoded image data according to the at least one split region. In other words, the coding unit determiner 120 may determine a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units.

The determined coded depth and the encoded image data according to the determined coded depth are output to the bitstream output unit 85.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the image encoder 83 that is dynamic range transformed may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A maximum depth according to an exemplary embodiment may denote the total number of splitting times from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the maximum depth may be set to 4.

As described above, the image data of the current picture is split into the maximum coding units according to a maximum size of the coding unit and each of the maximum coding units may include coding units split according to depths. As the maximum coding units are split according to depths, image data of a spatial domain included in the maximum coding units may be hierachically split according to depths. The deeper coding unit will be described with reference to FIGS. 10 through 19.

The dynamic range transformed image encoder 83 may perform intra prediction, inter prediction, transformation, and quantization based on at least one deeper coding unit of the maximum coding units.

The dynamic range transformed image encoder 83 may perform intra prediction and inter prediction for the current region using the image data, in which a dynamic range of the current region is transformed based on content. Here, dynamic range transformation based on content may correspond to the dynamic range transformation described in relation to the apparatus 100 for encoding a video.

According to an exemplary embodiment, a dynamic range may be transformed so that pixel values of the current picture are expanded in a range of the minimum limit value through maximum limit value which may be represented by current bit depths of the pixel values. Accordingly, the dynamic range transformed image encoder 83 may encode the current picture by using the image data, in which a dynamic range is transformed in a range of the minimum limit value through maximum limit value of the pixel values.

Accordingly, intra prediction and inter prediction for the current region may be performed respectively by using the image data, in which the dynamic range of the current picture is transformed. In this case, in the dynamic range of the current picture, a value larger than the highest limit value from among the pixel values of the current picture may be transformed to correspond to the maximum limit value, a value less than the lowest limit value is transformed to correspond to the minimum limit value, and pixel values between the highest limit value and the lowest limit value may be transformed to correspond one to one with values between the maximum limit value and the minimum limit value.

The highest limit value and the lowest limit value from among the pixel values of the current picture may be determined as the highest value and the lowest value, respectively, from among the pixel values of the current picture. Alternatively, when the highest limit value and the lowest limit value are separately set from among the pixel values of the current picture, a current pixel value that is higher than the highest limit value and less than the lowest limit value from among the current picture may be truncated according to the dynamic range transformation according to an exemplary embodiment.

According to an exemplary embodiment, the highest limit value and the lowest limit value may be determined according to one of data units from among a picture sequence of input video, a frame, a frame set for intra prediction, a region, and a coding unit.

The bitstream output unit 85 may perform intra prediction and inter prediction for previous pictures that are dynamic range transformed based on content of input video and thus residual data for the previous pictures may be output. The residual data for the previous pictures may be restored to restored pictures for the previous pictures through transformation, quantization, inverse quantization, inverse transformation, and deblocking filtering.

When dynamic ranges are transformed in each picture according to an exemplary embodiment, dynamic ranges of the restored pictures for the previous pictures are restored to original dynamic ranges and may be retransformed based on a dynamic range of a current picture. As such, inter prediction for the current picture may be performed by referring to the restored pictures generated to be based on the dynamic range same as the current picture.

The dynamic range transformed image encoder 83 may perform intra prediction on the current picture by using surrounding region information of the current region, in which a dynamic range is transformed.

The video encoding apparatus 80 may internally expand and use a bit depth of an image pixel value during encoding and decoding of input video. Accordingly, a dynamic range of the image data according to an internally expanded bit depth may be transformed and the image data of the transformed dynamic range may be used to perform intra prediction and inter prediction for the current picture.

The dynamic range transformed image encoder 83 may perform transformation on the residual data generated by intra prediction and inter prediction and perform quantization on the transformed coefficient generated by transformation.

When the video encoding apparatus 80 uses a video encoding method based on a coding unit according to a tree structure, the dynamic range transformed image encoder 83 may determine a depth, by which a final encoding result is to be output, by encoding regional and hierachical coding units. In other words, the dynamic range transformed image encoder 83 may determine a depth as a coded depth by encoding image data in a deeper coding unit in each maximum coding unit of the current picture and selects a depth in which a minimum encoding error is generated. An encoding mode for corresponding coding units may be determined in each of the at least one coded depth. The determined coded depth and image data according to the maximum coding unit are output to the bitstream output unit 85.

The image data in the maximum coding unit is encoded based on the deeper coding units according to at least one depth below the maximum depth and encoding results based on each deeper coding unit are compared. As a result of comparison of an encoding error of the deeper coding units, a depth having the least encoding error may be selected. At least one coded depth may be determined in each maximum coding unit.

A size of the maximum coding unit is split as the coding units are hierachically split according as a depth deepens, and the number of coding units increases. Also, even if the coding units included in one maximum coding unit have the same depths, encoding errors for each data are measured and whether to split into the lower depths is determined. Accordingly, even if data is included in one maximum coding unit, the encoding errors by the depths vary according to locations and thus the coded depths may be differently determined according to locations. Thus, at least one coded depth may be determined for one maximum coding unit and data of the maximum coding unit may be split according to the coding units of at least one coded depth.

Prediction encoding and transformation may be performed according to the maximum coding unit. The prediction encoding and the transformation are also performed based on the deeper coding units according to a depth equal to or depths less than the maximum depth, according to the maximum coding unit. According to an exemplary embodiment, the transformation performed for encoding a video may include frequency transformation, orthogonal transformation, or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The apparatus 80 for encoding a video may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the apparatus 80 for encoding a video may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split, the coding unit becomes a prediction unit of 2N×2N and a size of a partition may be 2N×2N, 2N×N, N×2N, or N×N. Examples of a partition type may include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the coding unit may be at least one of an intra mode, a inter mode, and a skip mode. For example, the intra mode or the inter mode may be performed on the prediction unit of 2N×2N, 2N×N, N×2N, or N×N. Also, the skip mode may be performed only on the prediction unit of 2N×2N. The encoding is independently performed on one prediction unit in a coding unit, thereby selecting a prediction mode having a least encoding error.

The apparatus 80 for encoding a video may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

Similarly to the coding unit having a tree structure according to an exemplary embodiment, the transformation unit in the coding unit may be recursively split into smaller sized regions, so that the transformation unit may be determined independently in units of regions. Thus, residual data in the coding unit may be divided according to the transformation having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when the size of the transformation unit is N×N, and may be 2 when the size of the transformation unit is N/2×N/2. That is, the transformation unit according to the tree structure may be set based on a transformation depth.

Encoding information according to coding units corresponding to a coded depth requires not only information about the coded depth, but also information related to prediction encoding and transformation. Accordingly, the dynamic range transformed image encoder 83 may not only determine a coded depth having a least encoding error, but also determine a partition type in a prediction unit, a prediction mode according to prediction units, and a size of a transformation unit for transformation.

Coding units according to a tree structure in a maximum coding unit and a method of determining a partition, according to exemplary embodiments, will be described in detail later with reference to FIGS. 11 and 12.

The dynamic range transformed image encoder 83 may measure an encoding error of deeper coding units according to depths by using rate-distortion optimization based on Lagrangian multipliers.

The bitstream output unit 85 may output a bitstream including information about a coded depth and an encoding mode, and encoded image data. The bitstream output unit 85 may perform entropy encoding on the encoded image data as an encoding result according to the coded depth and the encoding mode determined based on a coding unit according to a tree structure and output a bitstream including information about a coded depth and an encoding mode, and the encoded image data.

The bitstream output unit 85 may output image data of the maximum coding unit encoded based on at least one coded depth determined in the image encoder 83 that is dynamic range transformed and information about an encoding mode according to depths in bitstream form. The image data encoded by the dynamic range transformed image encoder 83 may be transformed in bitstream form through entropy encoding and may be inserted into a bitstream for transmission.

The image data encoded according to an exemplary embodiment may be obtained by encoding residual data of an image. The information about the encoding mode according to coded depth may include information about the coded depth, about the partition type in the prediction unit, the prediction mode for each prediction unit, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since at least one coded depth is determined for one maximum coding unit, and information about at least one encoding mode is determined for a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the bitstream output unit 85 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the bitstream output unit 85 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into SPS (Sequence Parameter Set) or a header of a bitstream.

In the apparatus 80 for encoding a video, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Also, the bitstream output unit 85 may encode information about a dynamic range for dynamic range restoration and may insert the encoded information into a bitstream for transmission. The bitstream output unit 85 may receive additional information about dynamic range transformation from the image encoder 83 that is dynamic range transformed, encode the received information, and insert the encoded information into a bitstream.

For example, the information about dynamic range transformation may be inserted into a sequence parameter set or a slice header of a bitstream including encoded data of a current picture. The information about dynamic range transformation according to an exemplary embodiment may include information about the highest limit value and the lowest limit value of content of input video. In order to save bit numbers, a value obtained by subtracting the highest limit value from the difference between the maximum limit value and the minimum limit value of a pixel value may be encoded, instead of information about the highest limit value.

Accordingly, the video encoding apparatus 80 may determine a coding unit having an optimum form and size in each maximum coding unit based on a size of the maximum coding unit and maximum depth determined in consideration of characteristics of the current picture. Also, each maximum coding unit may be encoded by using various prediction modes and transformation methods and thus an optimum encoding mode may be determined in consideration of image characteristics of coding units having various image sizes.

Accordingly, when an image having very high resolution or having very large amount of data is encoded in a general macroblock unit, the number of macroblocks per picture excessively increases. Accordingly, compressed information generated in each macroblock increases so that a load of compressed information transmission increases and data compression efficiency reduces. Thus, the video encoding apparatus according to an exemplary embodiment may increase the maximum size of the coding unit in consideration of image sizes and control the coding unit in consideration of image characteristics so that image compression efficiency may be improved.

Also, image processing such as intra prediction and inter prediction may be precisely performed according to coding units by using image data in which a dynamic range is expanded based on content so that image quality according to encoding and decoding may be improved.

Figure 9:
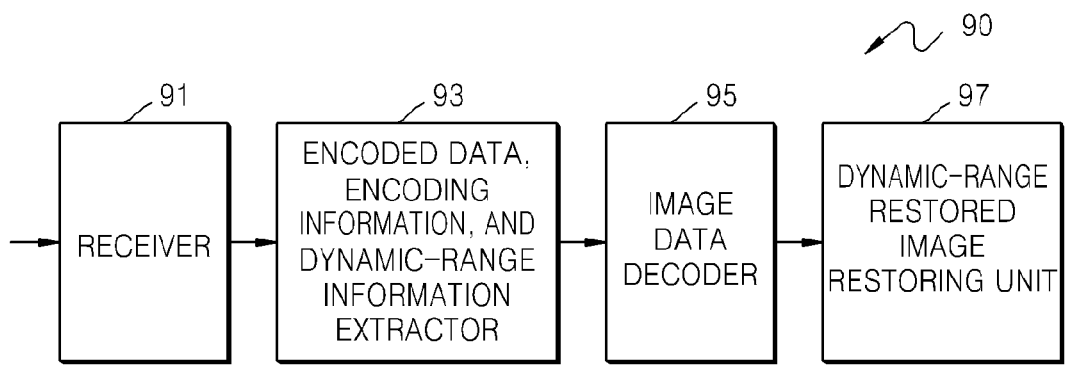
FIG. 9 is a block diagram of an apparatus for decoding a video by using dynamic range transformation based on content, based on a coding unit according to a tree structure, according to an exemplary embodiment.

FIG. 9 is a block diagram of an apparatus 90 for decoding a video by using dynamic range transformation based on content, based on a coding unit according to a tree structure, according to an exemplary embodiment.

The apparatus 90 for decoding a video according to the current exemplary embodiment includes a receiver 91, an encoded data, encoding information, and a dynamic range information extractor 93, an image data decoder 95, and a dynamic range restored image restoring unit 97. For convenience of description, the apparatus 90 for decoding a video by using dynamic range transformation based on content, based on a coding unit according to a tree structure may be referred to as a video decoding apparatus 90, the encoded data, encoding information, and dynamic range information extractor 93 may be referred to as the information extractor 93, and the dynamic range restored image restoring unit 97 may be referred to as the image restoring unit 97.

Definitions of various terms, such as a coding unit, a depth, a prediction unit, a transformation unit, and information about various encoding modes, for various operations of the apparatus 90 for decoding a video are identical to those described with reference to FIG. 8 and the apparatus 80 for encoding a video.

The receiver 91 according to the current exemplary embodiment may receive a bitstream for encoded video and parses the received bitstream. The information extractor 93 extracts encoded data, encoding information, and information about a dynamic range from the parsed bitstream. The extracted encoded data and encoding information are output to the image data decoder 95. The information about a dynamic range may be output to the image restoring unit 97.

The information extractor 93 may extract information about a maximum size of a coding unit of a current picture, from a header about the current picture.

Also, the information extractor 93 may extract information about a coded depth according to each maximum coding unit and an encoding mode from the parsed bitstream. The extracted information about the coded depth and the encoding mode is output to the image data decoder 95. In other words, the image data in a bit stream is split into the maximum coding unit so that the image data decoder 95 may decode the image data for each maximum coding unit.

The information about the coded depth and the encoding mode according to the maximum coding unit may be set for information about at least one coding unit, and information about an encoding mode for a coded depth may include information about a partition type according to a coding unit, about a prediction mode, and a size of a transformation unit.

The information about the coded depth and the encoding mode according to each maximum coding unit extracted by information extractor 93 is information about a coded depth and an encoding mode determined to generate a minimum encoding error when an encoder, such as the apparatus 80 for encoding a video, repeatedly performs encoding for each deeper coding unit according to depths according to each maximum coding unit. Accordingly, the apparatus 90 for decoding a video may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the information extractor 93 may extract the information about the coded depth and the encoding mode according to the predetermined data units. The predetermined data units to which the same information about the coded depth and the encoding mode is assigned may be inferred to be the data units included in the same maximum coding unit.

The image data decoder 95 may decode the image data in each maximum coding unit based on the information about the coded depth and the encoding mode according to the maximum coding units. In other words, the image data decoder 95 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 95 may perform intra prediction or motion compensation according to a partition and a prediction mode of each coding unit, based on the information about the partition type and the prediction mode of the prediction unit of the coding unit according to coded depths.

Also, the image data decoder 95 may perform inverse transformation according to each transformation unit in the coding unit, based on the information about the size of the transformation unit of the coding unit according to coded depths, so as to perform the inverse transformation according to maximum coding units.

The image data decoder 95 may determine at least one coded depth of a current maximum coding unit by using split information according to depths. If the split information indicates that image data is decoded in the current depth, the current depth is a coded depth. Accordingly, the image data decoder 95 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 95 in the same encoding mode.

Image data decoded based on deeper coding units by the image data decoder 95 may be input to the image restoring unit 97. The image restoring unit 97 may restore decoded image data according to maximum coding units and may restore a current picture. In order to improve the restored quality of the current picture, in-loop filtering such as deblocking filtering or adaptive loop filtering may be performed.

When image data encoded based on a dynamic range that is transformed based on content is decoded, the image restoring unit 97 may restore an original dynamic range of a current picture by using extracted information about a dynamic range.

The information about a dynamic range extracted by the information extractor 93 may include information about dynamic range transformation of a current picture. For example, the received information about dynamic range transformation may include information about the highest limit value and the lowest limit value of original video content. Information about a value obtained by subtracting the highest limit value from the difference between the maximum limit value and the minimum limit value of a pixel value may be included in the extracted information, instead of information about the highest limit value.

Also, information about data units, in which the highest limit value and the lowest limit value of a current region are set, may be received. For example, the highest limit value and the lowest limit value of the current region may be set according to one of data units from among an image sequence of original video, a picture, a frame, a frame set for intra prediction, a region, and a coding unit.

The image restoring unit 97 may restore restored pixel values expanded in a range of the maximum limit value through the minimum limit value which may be represented as current bit depths to a dynamic range of a current region with respect to image data restored by decoding or loop filtering.

The image restoring unit 97 may restore the maximum limit value and the minimum limit value from among the restored pixel values to correspond one to one with the highest limit value and the lowest limit value from among the pixel values of the current region and may transform values between the maximum limit value and the minimum limit value to correspond one to one with values between the highest limit value and the lowest limit value. The highest limit value and the lowest limit value of the current region may be the highest value and the lowest value from among the pixel values of the current region.

The image restoring unit 97 may transform a value obtained by adding the lowest limit value to a value obtained by dividing a value obtained by multiplying the current restored data value and 'the difference between the 'highest limit value and the lowest limit value,' by 'the difference between the 'maximum limit value and the minimum limit value' so as to correspond one to one with values between the maximum limit value and the minimum limit value. The image restoring unit 97 may operate and output pixel values that correspond one to one with values between the maximum limit value and the minimum limit value by using an a bit shift operation using a current bit depth. The current bit depth may be a bit depth that is internally expanded during video encoding and decoding.

According to an exemplary embodiment, the current region restored by the image restoring unit 97 may include pixel values undergone a truncation process in which a current pixel value that is higher than the highest limit value of a corresponding original image or less than the lowest limit value thereof from among the current region may be truncated.

The image data decoder 95 may perform motion compensation for the current picture by referring to restored pictures for previous pictures of original video. When information about dynamic range transformation is set according to picture units, the image data decoder 95 may receive the restored pictures for the previous pictures from the image restoring unit 97, retransform a dynamic range of the restored pictures based on the transformed dynamic range of the current picture, and thus perform motion compensation of the current picture by referring to the restored pictures based on the dynamic range that is expanded in the same manner.

The video decoding apparatus 90 may recursively perform encoding for each maximum coding unit, acquires information about coding units that generate the least encoding error, and may perform decoding on the current picture by using the information. In other words, image data may be decoded by an optimum coding unit in each maximum coding unit. Also, when image data encoded after a dynamic range is transformed is decoded, the received information about dynamic range transformation may be used to restore a dynamic range of an original picture so that data encoded through accurate intra prediction and inter prediction according to coding units may be decoded by an optimum coding unit in each maximum coding unit.

Hereinafter, coding units according to a tree structure for video encoding and decoding that use dynamic range transformation based on content will be described in detail with reference to FIGS. 10 through 20.

Figure 10:
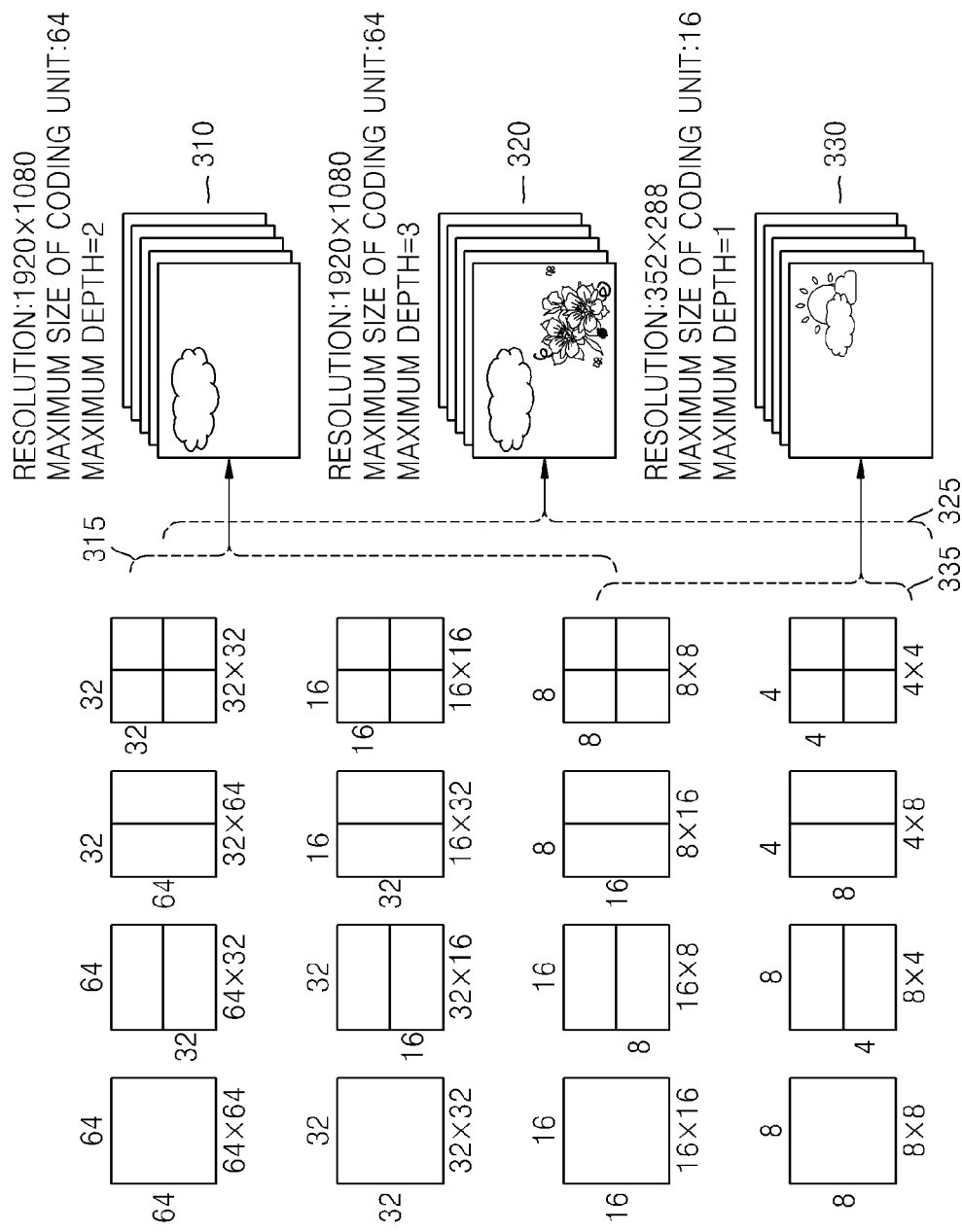
FIG. 10 is a diagram for describing a concept of coding units according to an exemplary embodiment.

FIG. 10 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 11:
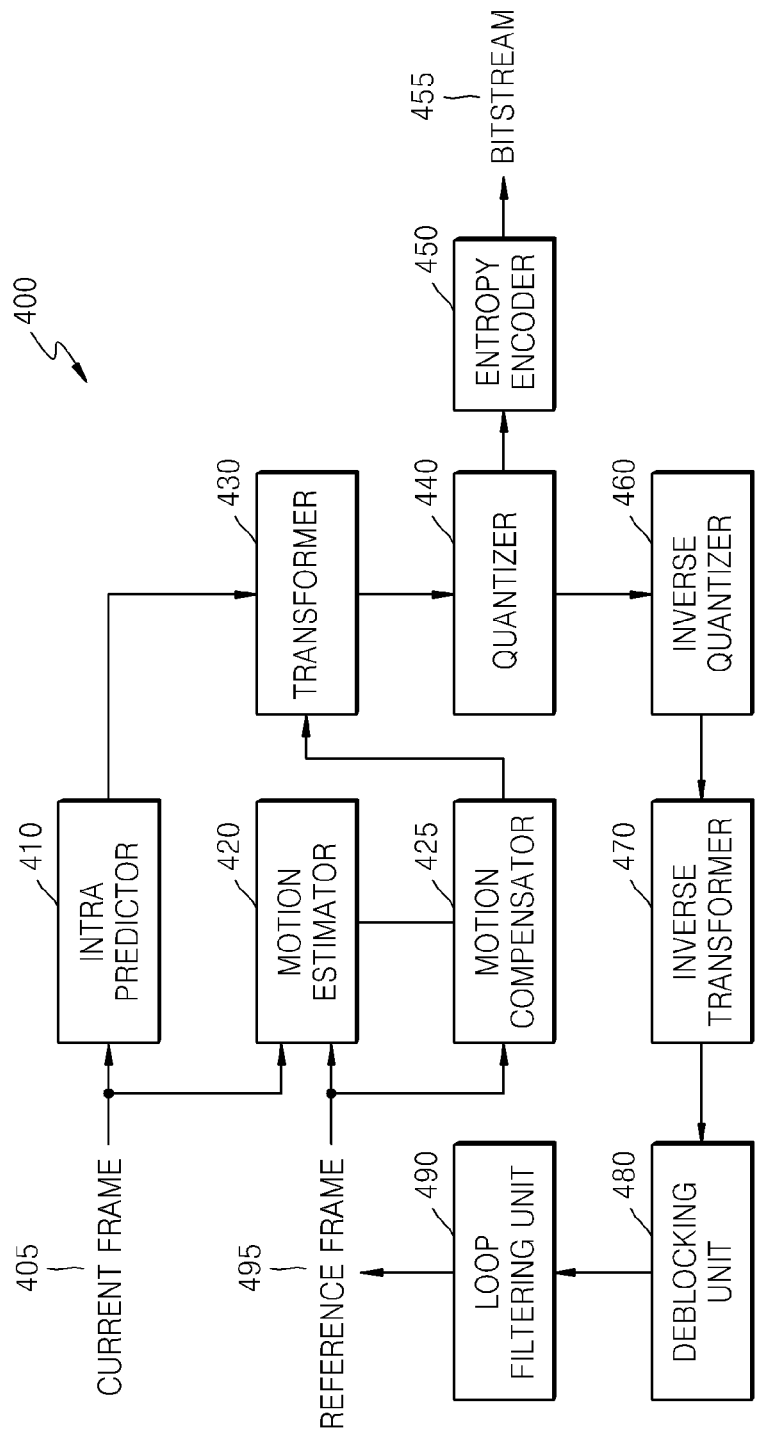
FIG. 11 is a block diagram of an image encoder based on coding units according to an exemplary embodiment.

FIG. 11 is a block diagram of an image encoder 400 based on coding units according to an exemplary embodiment.

The image encoder 400 performs operations of the dynamic range transformed image encoder 83 of the apparatus 80 for encoding a video to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the apparatus 80 for encoding a video, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 12:
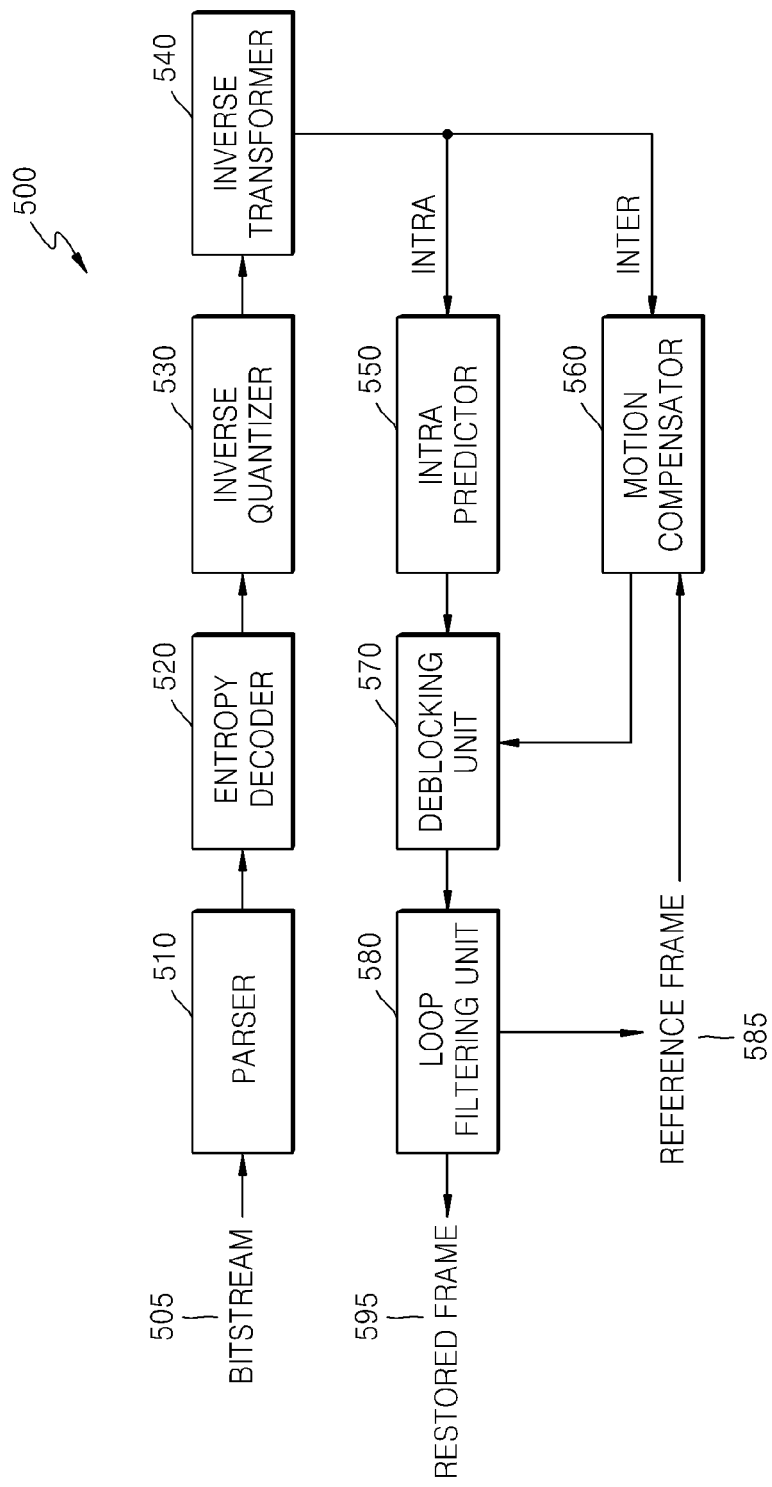
FIG. 12 is a block diagram of an image decoder based on coding units according to an exemplary embodiment.

FIG. 12 is a block diagram of an image decoder 500 based on coding units according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 95 of the apparatus 90 for decoding a video, the image decoder 500 may perform operations that are performed after the parser 510.

In order for the image decoder 500 to be applied in the apparatus 90 for decoding a video, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units of coded depths for each maximum coding unit.

Specifically, the intra prediction 550 and the motion compensator 560 determine partitions and a prediction mode for each of the coding units having a tree structure, and the inverse transformer 540 determines a size of a transformation unit for each coding unit.

Figure 13:
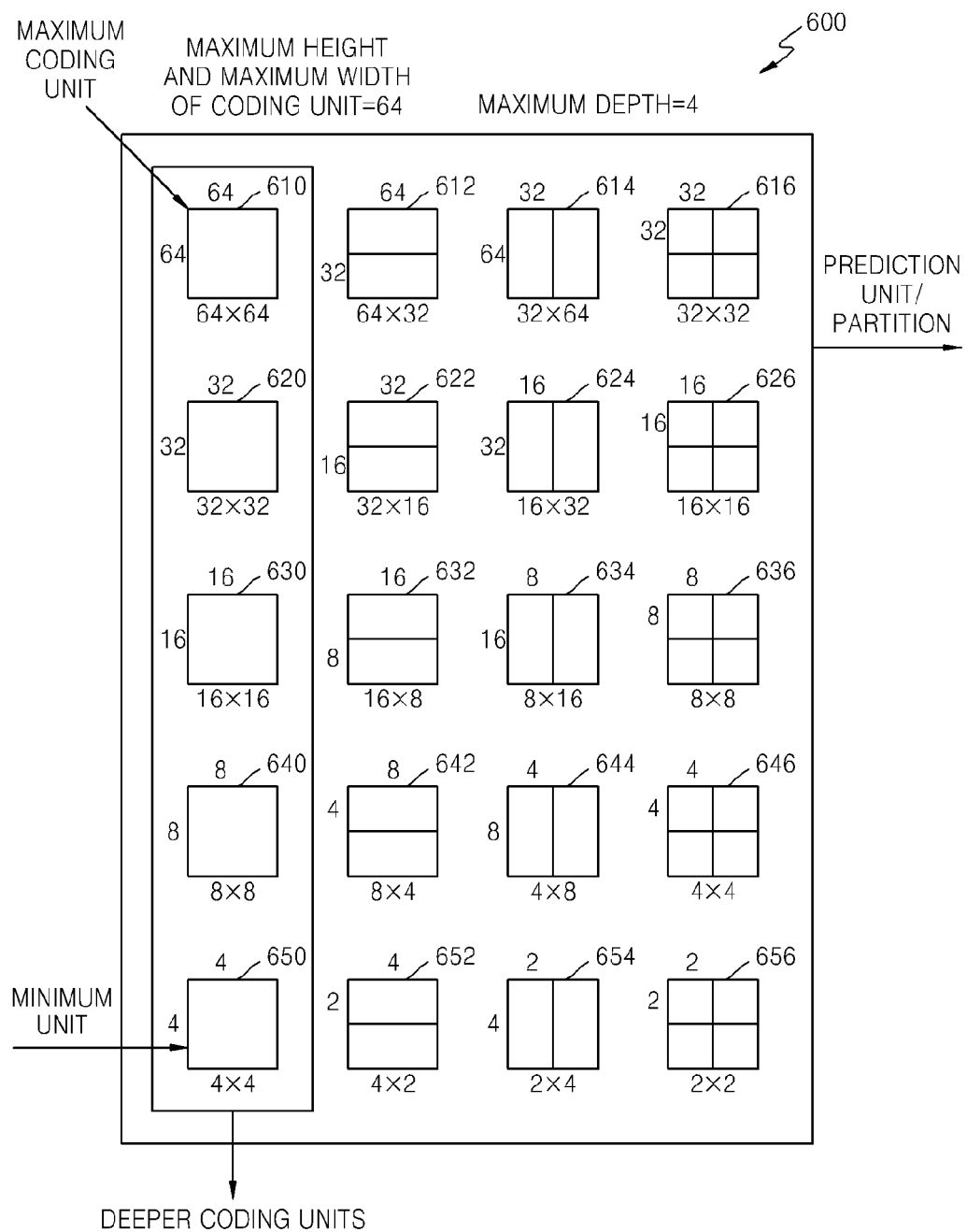
FIG. 13 is a diagram illustrating deeper coding units according to depths and prediction units according to an exemplary embodiment.

FIG. 13 is a diagram illustrating deeper coding units according to depths and prediction units according to an exemplary embodiment.

The apparatus 80 for encoding a video and the apparatus 90 for decoding a video use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. The maximum depth shown denotes a total number of splits from a maximum coding unit to a minimum decoding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the encoding unit 610, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e., a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4. Also, partitions 652 having a size 4×2, partitions 654 having a size 2×4, and partitions 656 having a size 2×2 may be used.

In order to determine the at least one coded depth of the coding units constituting the maximum coding unit 610, the image encoder 83 of the apparatus 80 for encoding a video performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 14 is a diagram for describing a relationship between a coding unit 710 and transformation units 720, according to an exemplary embodiment.

The apparatus 80 for encoding a video or the apparatus 90 for decoding a video encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the apparatus 80 for encoding a video or the apparatus 90 for decoding a video, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 15 is a diagram for describing encoding information of coding units corresponding to a coded depth, according to an exemplary embodiment.

The bitstream output unit 85 of the apparatus 80 for encoding a video may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The information extractor 93 of the apparatus 90 for decoding a video may extract and use the information 800, 810, and 820 for decoding, according to each deeper coding unit.

Figure 16:
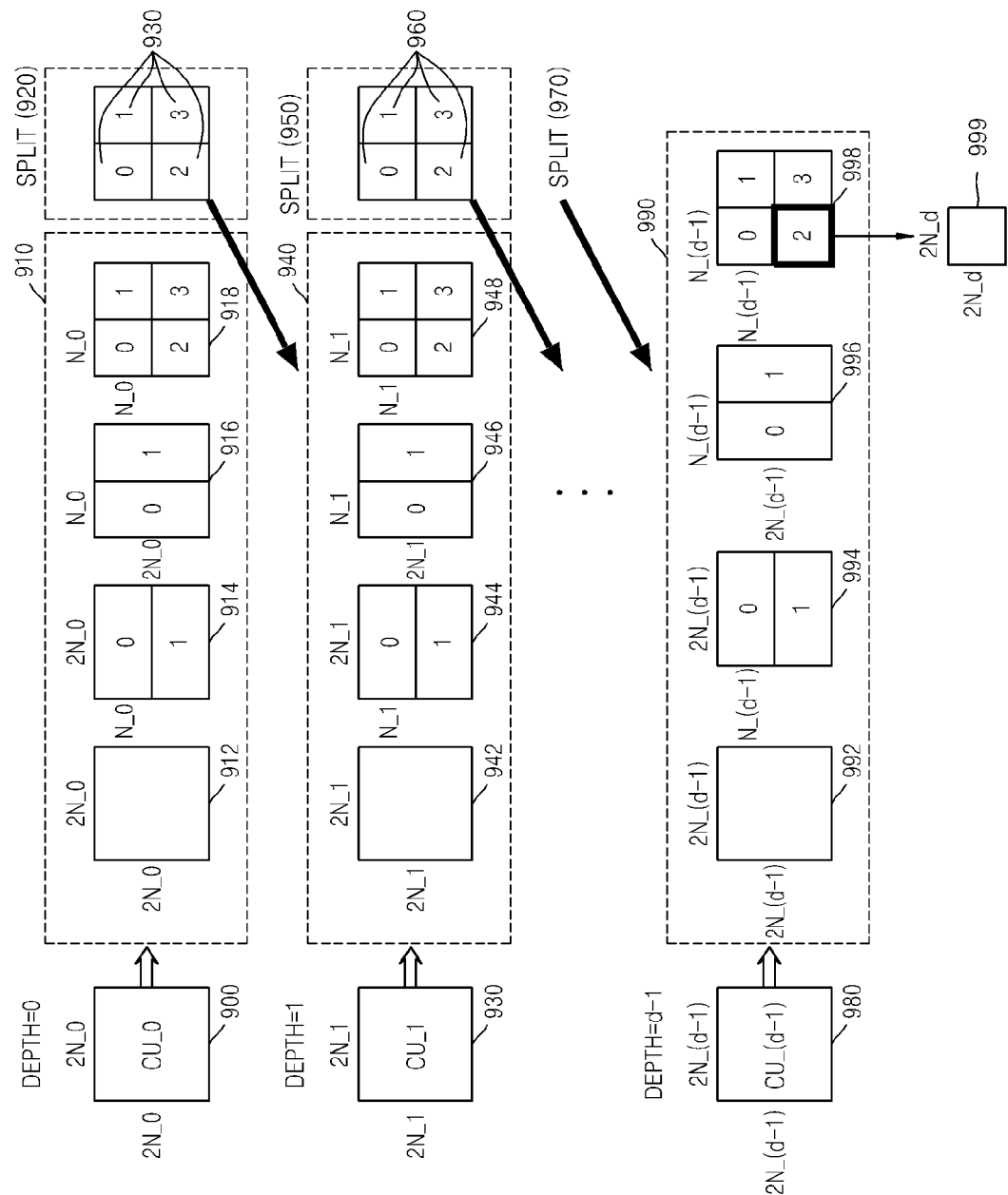
FIG. 16 is a diagram of deeper coding units according to depths, according to an exemplary embodiment.

FIG. 16 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 16 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d, split information for the coding unit 952 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the apparatus 80 for encoding a video may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 0 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The information extractor 93 of the apparatus 90 for decoding a video may extract and use the information about the coded depth and the prediction unit of the coding unit 900 to decode the partition 912. The apparatus 90 for decoding a video may determine a depth, in which split information is 0, as a coded depth by using split information according to depths, and use information about an encoding mode of the corresponding depth for decoding.

Figure 17:
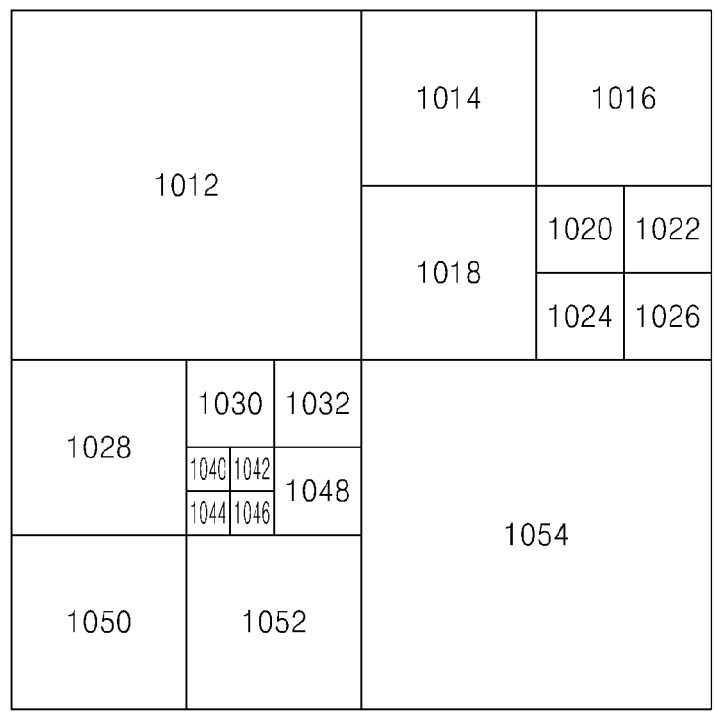
FIGS. 17 through 19 are diagrams for describing a relationship between coding units, prediction units, and transformation units, according to an exemplary embodiment.
Figure 18:
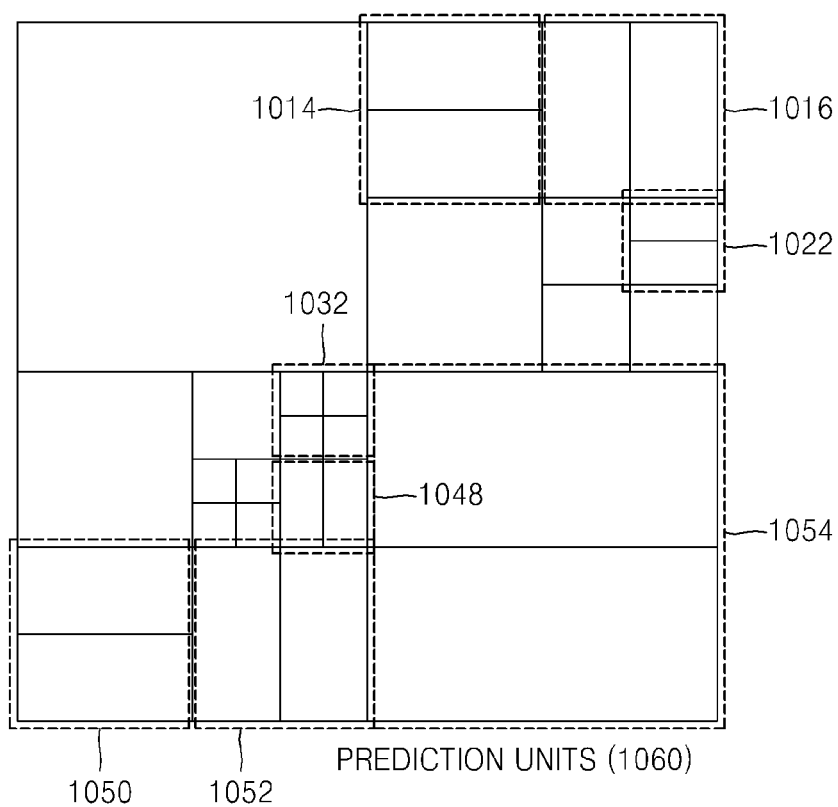
Figure 19:
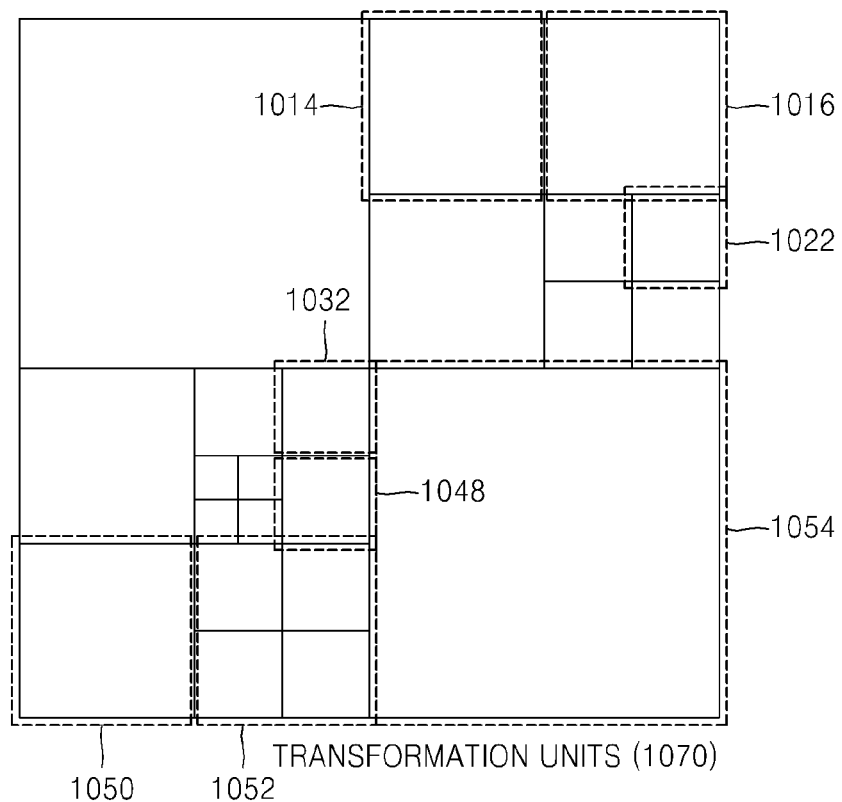

FIGS. 17 through 19 are diagrams for describing a relationship between coding units 1010, prediction units 1060, and transformation units 1070, according to an exemplary embodiment.

The coding units 1010 are coding units corresponding to coded depths determined by the apparatus 100 for encoding a video, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the apparatus 80 for encoding a video and the apparatus 90 for decoding a video may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the apparatus 80 for encoding a video and the apparatus 90 for decoding a video.

partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may

TABLE 1

| Split Information 0 (Encoding on Coding Unit having Size of 2N×2N and Current Depth of d) | | | | | Split Information 1 |
|---|---|---|---|---|---|
| prediction mode | Partition Type | | Size of Transformation Unit | | |
| Intra Inter Skip (Only 2N×2N) | Symmetrical Partition Type 2N×2N 2N×N N×2N N×N | Asymmetrical Partition Type 2N×nU 2N×nD nL×2N nR×2N | Split Information 0 of Transformation Unit 2N×2N | Split Information 1 of Transformation Unit N×N (Symmetrical Type) N/2×N/2 (Asymmetrical Type) | Repeatedly Encode Coding Units having Lower Depth of d+1 |

The bitstream output unit 85 of the apparatus 80 for encoding a video may output the encoding information about the coding units having a tree structure, and the information extractor 93 of the apparatus 90 for decoding a video may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 20:
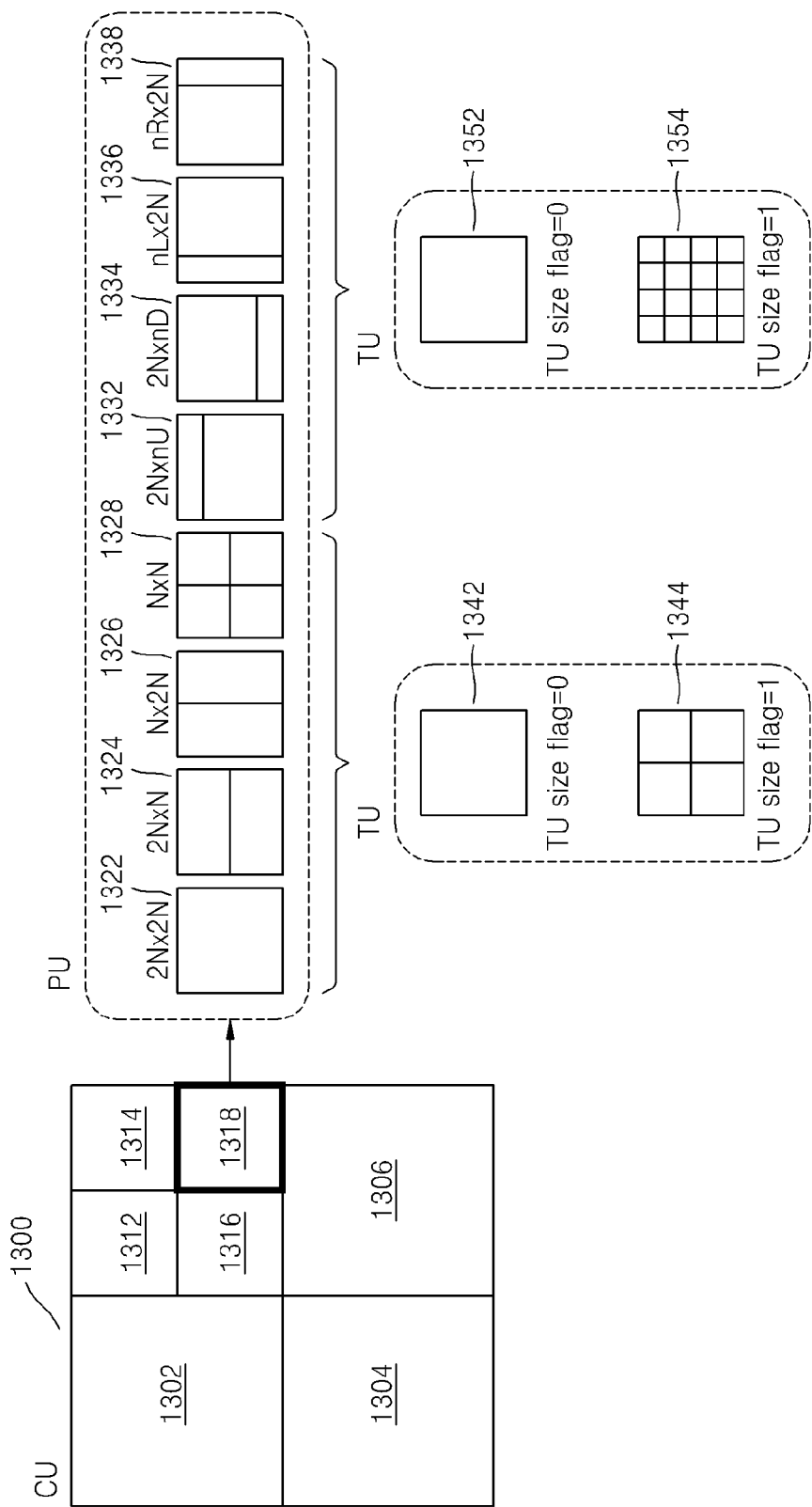
FIG. 20 is a diagram for describing a relationship between a coding unit, a prediction unit, and a transformation unit, according to encoding mode information of Table 1.

FIG. 20 is a diagram for describing a relationship between a coding unit, a prediction unit, and a transformation unit, according to encoding mode information of Table 1.

A maximum coding unit 1300 includes coding units 1302, 1304, 1306, 1312, 1314, 1316, and 1318 of coded depths.

Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Transformation unit split information TU size flag is one of transformation indexes and a size of a transformation unit corresponding to the transformation index may vary according to a prediction unit type or a partition type of a coding unit.

For example, when the partition type is set to be symmetrical, i.e., the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 18, the TU size flag is a flag having a value or 0 or 1, but the TU size flag is not limited to 1 bit, and a transformation unit may be hierarchically split having a tree structure while the TU size flag increases from 0. The TU size flag may be used as an example of transformation indexes.

In this case, the size of a transformation unit that has been actually used may be expressed by using a TU size flag of a transformation unit, according to an exemplary embodiment, together with a maximum size and minimum size of the transformation unit. According to an exemplary embodiment, the apparatus 80 for encoding a video is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the apparatus 90 for decoding a video may decode video by using the maximum transformation unit size information, the minimum transformation unit size information, and the maximum TU size flag.

For example, if the size of a current coding unit is 64×64 and a maximum transformation unit size is 32×32, then the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, then the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize' when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and an exemplary embodiment is not limited thereto.

Figure 21:
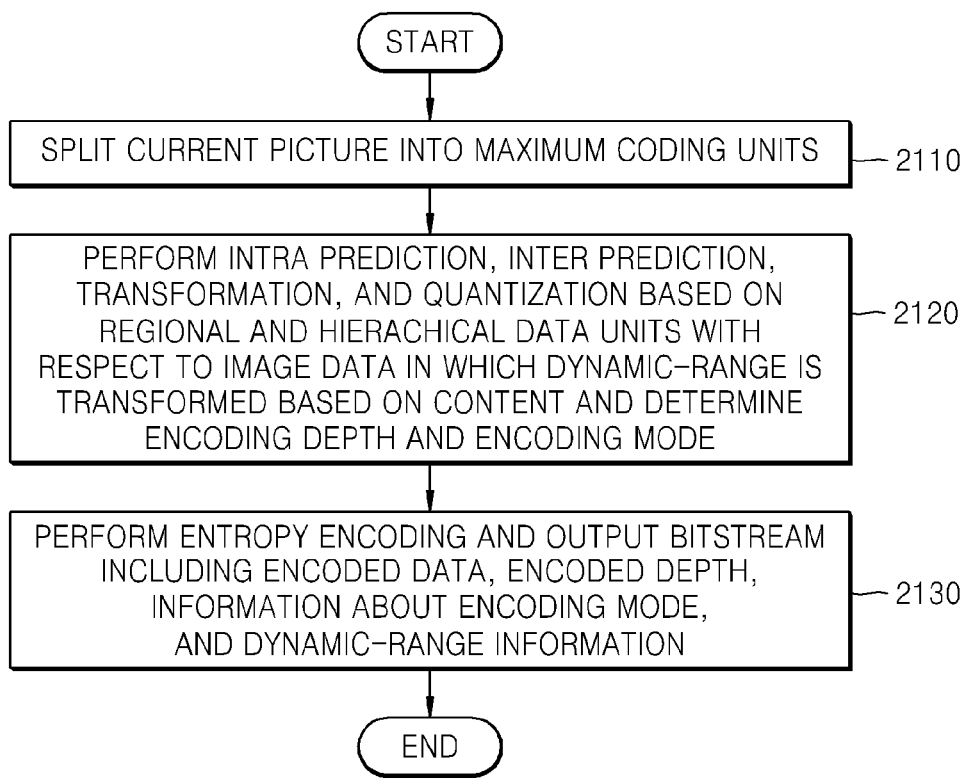
FIG. 21 is a flowchart illustrating a method of encoding a video by using dynamic range transformation based on content, based on a coding unit according to a tree structure, according to an exemplary embodiment.

FIG. 21 is a flowchart illustrating a method of encoding a video by using dynamic range transformation based on content, based on a coding unit according to a tree structure, according to an exemplary embodiment.

In operation 2110, a current picture from an input video sequence is split into maximum coding units.

In operation 2120, a dynamic range is transformed based on content with respect to image data of the current picture, and intra prediction, inter prediction, transformation, and quantization based on the coding units according to a tree structure are performed on image data that is dynamic range transformed. As a result of recursive encoding according to regions of the maximum coding units, coded depths and an encoding mode may be determined. Intra prediction and inter prediction may be performed on image data in which a dynamic range is transformed based on content.

According to dynamic range transformation based on content, a dynamic range may be expanded so that pixel values within the highest limit value through the lowest limit value of an original image may correspond to values within the minimum limit value through the maximum limit value which may be represented as predetermined bit depths.

In operation 2130, entropy encoding is performed on data encoded according to deeper coding units in each maximum coding unit, and a bitstream including encoded data, coded depth, information about the encoding mode, and dynamic range information is output.

Figure 22:
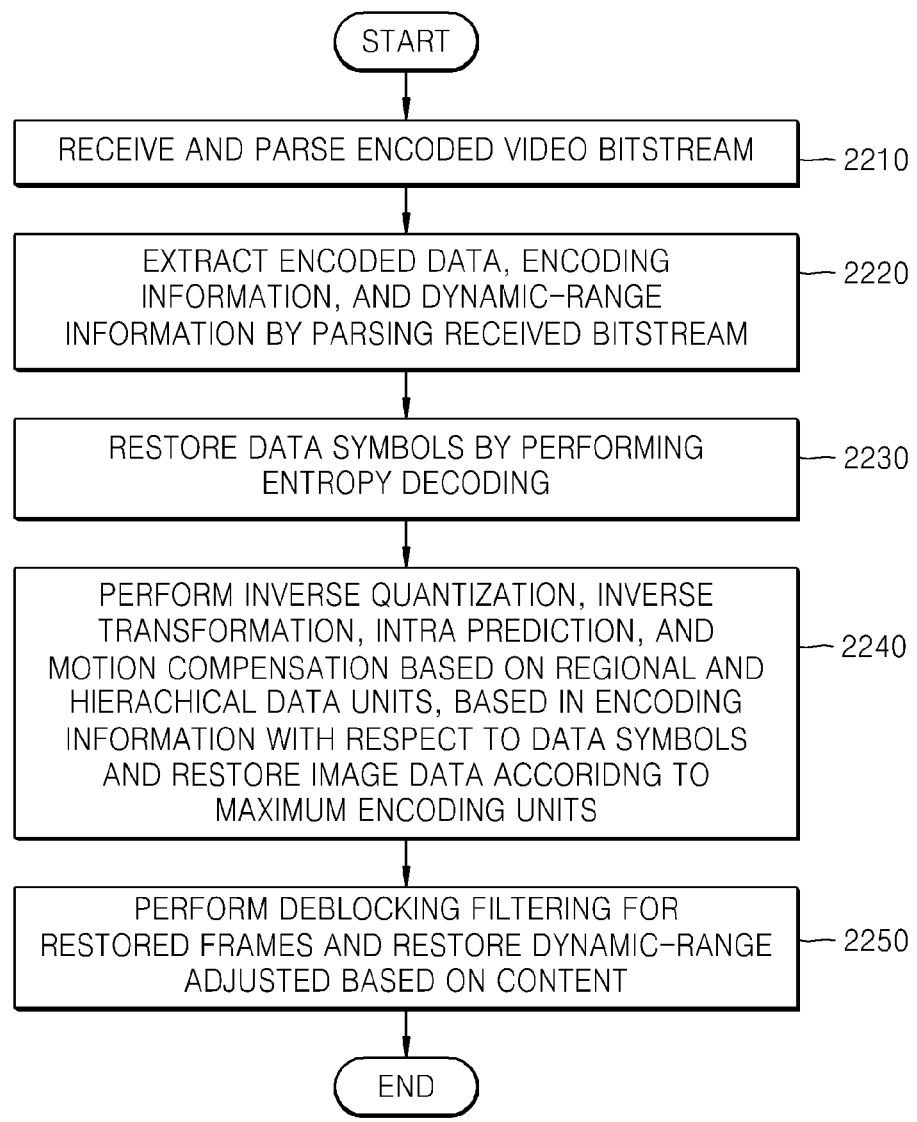
FIG. 22 is a flowchart illustrating a method of decoding a video by using dynamic range transformation based on content, based on a coding unit according to a tree structure, according to an exemplary embodiment.

FIG. 22 is a flowchart illustrating a method of decoding a video by using dynamic range transformation based on content, based on a coding unit according to a tree structure, according to an exemplary embodiment.

In operation 2210, an encoded video bitstream is received. In operation 2220, the received bitstream is parsed and encoded data, encoding information, and dynamic range information are extracted from the parsed bitstream. In operation 2230, entropy decoding is performed on the encoded data and thus data symbols are restored.

In operation 2240, inverse quantization, inverse transformation, intra prediction, and motion compensation based on the coding units according to a tree structure are performed on the data symbols based on the encoding information, and image data is decoded according to maximum coding units.

In operation 2250, in-loop filtering such as deblocking filtering is performed on the encoded picture so as to restore the current picture and a dynamic range of the current picture is restored. When information about dynamic range transformation is extracted from a bitstream, an original dynamic range of the current picture may be restored based on the information about dynamic range transformation.

According to dynamic range restoration based on content, a dynamic range may be reduced so that values in the minimum limit value through the maximum limit value of restored image data may correspond one to one with pixel values in the highest limit value through the lowest limit value of an original image.

According to the method of encoding video by using dynamic range transformation based on content, based on coding units according to a tree structure or the method of decoding video by using dynamic range transformation based on content, based on coding units according to a tree structure, a dynamic range of an input image is expanded and thus image processing such as intra prediction and inter prediction may be precisely performed. Accordingly, image quality according to encoding and decoding may be improved.

Exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and storage media such as optical recording media (e.g., CD-ROMs, or DVDs).

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A method of encoding a video by using dynamic range transformation based on content, the method comprising:
    performing inter prediction, through motion estimation, and intra prediction for a current region using image data in which a dynamic range of the current region is transformed based on content of an image of input video;
    performing transformation on residual data generated by the performing the intra prediction and the inter prediction, and performing quantization on a transformation coefficient generated by the performing the transformation; and
    performing entropy encoding on the quantized transformation coefficient and outputting a bitstream comprising the encoded data for the current region,
    wherein in the performing the intra prediction and the inter prediction, the intra prediction and the inter prediction are performed using the image data in which the dynamic range is transformed so that pixel values of the current region are expanded in a range of a maximum limit value through a minimum limit value represented as current bit depths of the pixel values, and
    wherein in the performing the intra prediction and the inter prediction, a value higher than a highest limit value from among the pixel values of the current picture is transformed to correspond to the maximum limit value, a value less than a lowest limit value from among the pixel values of the current picture is transformed to correspond to the minimum limit value, and pixel values between the highest limit value and the lowest limit value from among the pixel values of the current picture are transformed to correspond one to one with values between the maximum limit value and the minimum limit value.

2. The method of claim 1, wherein the highest limit value and the lowest limit value are a largest value and a smallest value, respectively, from among the pixel values of the current region.

3. The method of claim 1, wherein in the performing the intra prediction and the inter prediction, first pixel values correspond one to one with the pixel values between the highest limit value and the lowest limit value, the first pixel values obtained by dividing a value obtained by multiplying a difference between a current pixel value and the lowest limit value and a difference between the maximum limit value and the minimum limit value by a difference between the highest limit value and the lowest limit value.

4. The method of claim 3, wherein the first pixel values that correspond one to one with the pixel values between the highest limit value and the lowest limit value are output using a bit shift operation using the current bit depths.

5. The method of claim 1, wherein the current bit depths are bit depths that are internally expanded during encoding and decoding of the input video.

6. The method of claim 5, wherein the current bit depths are a sum total of a first bit depth for dynamic range expansion and a second bit depth that is internally expanded.

7. The method of claim 6, wherein the performing of the intra prediction and the inter prediction comprises:
    expanding a bit depth of a pixel value of the input video by the second bit depth;
    expanding a dynamic range of intermediate data of the expanded bit depth expanded by the second bit depth, by the first bit depth; and
    performing the intra prediction and the inter prediction on the intermediate data in which the dynamic range is expanded.

8. The method of claim 7, wherein in the expanding the dynamic range, a value higher than a highest limit value from the intermediate data is transformed to correspond to the maximum limit value, a value less than a lowest limit value from among the pixel values of the current picture is transformed to correspond to the minimum limit value, and data between the highest limit value and the lowest limit value from the intermediate data is transformed to correspond one to one with values between the maximum limit value and the minimum limit value.

9. The method of claim 8, wherein in the expanding the dynamic range, the pixel values that correspond one to one with the pixel values between the highest limit value and the lowest limit value are output by a bit shift operation using the first bit depth and the second bit depth.

10. The method of claim 1, wherein in the performing the intra prediction and the inter prediction, the intra prediction and the inter prediction are performed using the image data in which the dynamic range is transformed according to a luma component and a chroma component of the pixel values of the current region.

11. The method of claim 1, wherein the pixel values between the highest limit value and the lowest limit value from among the pixel values of the current region are transformed to correspond one to one with values between the maximum limit value and the minimum limit value according to a non-linear function relationship.

12. The method of claim 11, wherein the pixel values between the highest limit value and the lowest limit value from among the pixel values of the current region are split into a predetermined number of sections, the pixel values for each section of the predetermined number of sections are determined as corresponding result values according to a function that linearly increases in each section, and the result values in successive sections from among the predetermined number of sections continue so that the result values for the pixel values in the sections correspond one to one with the values between the maximum limit value and the minimum limit value.

13. The method of claim 1, wherein a current pixel value that is higher than the highest limit value or less than the lowest limit value is truncated.

14. The method of claim 1, wherein the highest limit value and the lowest limit value are determined according to one of data units from among an image sequence of the input video, a frame, a frame set for the intra prediction, a region, and a coding unit.

15. The method of claim 1, wherein the performing the intra prediction and the inter prediction comprises:
restoring a dynamic range of restored regions generated through intra prediction, inter prediction through motion estimation and compensation, transformation, quantization, inverse quantization, inverse transformation, and deblocking filtering on previous frames in which a dynamic range is transformed based on content of the image of the input video;
transforming the restored dynamic range of the restored regions, based on the dynamic range of the current region; and
performing the inter prediction for the current region by referring to a reference frame in which the dynamic range is transformed.

16. The method of claim 1, further comprising encoding information about the dynamic range transformation and transmitting the encoded information.

17. The method of claim 16, wherein the information about the dynamic range transformation comprises information about the highest limit value and the lowest limit value of the content of the image of the input video.

18. The method of claim 1, wherein:
in the performing the intra prediction and the inter prediction, the intra prediction and the inter prediction are performed for at least one deeper coding unit according to regions obtained by hierachically splitting a maximum coding unit as a depth deepens with respect to the maximum coding unit split from the current region into coding units having predetermined maximum sizes;
in the performing the transformation and the quantization, the transformation and the quantization are performed in at least one deeper coding unit according to the regions with respect to the maximum coding unit;
the method further comprising determining an encoding mode for the coding unit of the coded depth including information about at least one coded depth that generates a least encoding error with respect to an original image; and
in the performing the entropy encoding, the entropy encoding is performed on the encoded image data that is an encoding result according to the determined coded depth and encoding mode, and outputting information about the determined coded depth and encoding mode and the bitstream comprising the encoded image data.

19. A method of decoding a video by using dynamic range transformation based on content, the method comprising:
extracting encoded data of a current region of original video by parsing a received bitstream;
restoring data symbols by performing entropy decoding on the extracted encoded data;
restoring residual data for the current region by performing inverse quantization and inverse transformation on the restored data symbols and restoring image data by performing intra prediction and motion compensation on the restored residual data; and
restoring the current region by performing deblocking filtering on the restored image data and restoring a transformed dynamic range of the current region based on content of an image of the original video,
wherein in the restoring the current region, restored pixel values expanded in a range of a maximum limit value through a minimum limit value represented as current bit depths of the pixel values are restored to the dynamic range of the current region, and
wherein in the restoring the current region, the maximum limit value and the minimum limit value from among the restored image data are restored to correspond to a highest limit value and a lowest limit value, respectively, from among the pixel values of the current region, and values between the maximum limit value and the minimum limit value from among the restored image data are transformed to correspond one to one with values between the highest limit value and the lowest limit value.

20. The method of claim 19, wherein the highest limit value and the lowest limit value are a highest value and a lowest value from among the pixel values of the current region.

21. The method of claim 19, wherein in the restoring the current region, first pixel values correspond one to one with values between the maximum limit value and the minimum limit value, the first pixel values obtained by adding the lowest limit value to a value obtained by dividing a value obtained by multiplying the current restored data value and a difference between the highest limit value and the lowest limit value, by a difference between the maximum limit value and the minimum limit value.

22. The method of claim 21, wherein the first pixel values that correspond one to one with the values between the highest limit value and the lowest limit value are output by a bit shift operation using current bit depths.

23. The method of claim 19, wherein the current bit depths are bit depths that are internally expanded during encoding and decoding of the video.

24. The method of claim 21, wherein the current bit depths are a sum total of a first bit depth for dynamic range expansion and a second bit depth that is internally expanded.

25. The method of claim 24, wherein the restoring the current region comprises:
restoring a dynamic range of the restored image data expanded by the first bit depth; and
restoring a bit depth of a pixel value of the current region by reducing a bit depth of intermediate data generated by restoring the dynamic range by the second bit depth.

26. The method of claim 25, wherein the restoring dynamic range comprises:
restoring the maximum limit value and the minimum limit value from among the restored image data to correspond to a highest limit value and a lowest limit value of the intermediate data, respectively; and
transforming values between the maximum limit value and the minimum limit value from among the restored image data to correspond one to one with values between the highest limit value and the lowest limit value of the intermediate data and generating the intermediate data.

27. The method of claim 26, wherein in the generating the intermediate data, the pixel values that correspond one to one with the pixel values between the highest limit value and the lowest limit value of the intermediate data are output by a bit shift operation using the first bit depth and the second bit depth.

28. The method of claim 19, wherein in the restoring the current region, the pixel values of the current region are restored by restoring a dynamic range according to a luma component and chroma components with respect to the restored image data.

29. The method of claim 19, wherein the values between the maximum limit value and the minimum limit value from among the restored image data are transformed to correspond one to one with values between the highest limit value and the lowest limit value according to a non-linear function relationship.

30. The method of claim 29, wherein when the pixel values between the maximum limit value and the minimum limit value from among the restored image data are split into a predetermined number of sections, the data for each section of the predetermined number of sections is determined as corresponding pixel values according to a function that linearly increases in each section, and the pixel values corresponding to the data in successive sections from among the predetermined number of sections continue so that the pixel values for the data in the sections correspond one to one with the values between the highest limit value and the lowest limit value.

31. The method of claim 19, wherein a current pixel value that is higher than the highest limit value or less than the lowest limit value is truncated.

32. The method of claim 19, wherein the highest limit value and the lowest limit value are determined according to one of data units from among an image sequence of the input video, a frame, a frame set for the intra prediction, a region, and a coding unit.

33. The method of claim 19, further comprising receiving information about the original video for dynamic range transformation of the current region.

34. The method of claim 33, wherein the information about the dynamic range transformation comprises information about the highest limit value and the lowest limit value of content of the image of the original video.

35. The method of claim 19, wherein the restoring of the image data comprises:
restoring a dynamic range of restored regions for previous frames of the original video;
transforming a dynamic range of the restored regions based on a dynamic range of the current region; and
performing motion compensation for the current region by referring to the restored regions in which the dynamic range is transformed.

36. The method of claim 19, wherein:
in the restoring the data symbols, a picture from an input image sequence is split into coding units having predetermined maximum sizes during encoding of the received bitstream, encoding is performed for at least one deeper coding unit according to regions obtained by hierachically splitting a maximum coding unit as a depth deepens with respect to the maximum coding unit, information about an encoding mode for the coding unit of the coded depth including information about the at least one coded depth that generates a least amount of encoding errors with respect to an original image is further extracted from the bitstream; and
in the restoring the image data, the encoded image data is decoded by performing inverse quantization, inverse transformation, intra prediction, and motion compensation based on the coded depth and the encoding mode, based on the information about the encoding mode.

37. An apparatus for encoding a video by using dynamic range transformation based on content, the apparatus comprising:
an intra predictor which performs intra prediction for a current region using image data in which a dynamic range of the current region is transformed based on content of an image of input video;
an inter predictor which performs inter prediction through motion estimation for the current region using the image data in which the dynamic range of the current region is transformed;
a transformer which performs transformation on residual data generated by the performed intra prediction and the performed inter prediction;
a quantizer which performs quantization on a transformation coefficient generated by the performed transformation;
an entropy encoder which performs entropy encoding on the quantized transformation coefficient; and
an output unit which outputs a bitstream comprises encoded data for the current region generated by the performed entropy encoding,
wherein the intra prediction and the inter prediction are performed using the image data in which the dynamic range is transformed so that pixel values of the current region are expanded in a range of a maximum limit value through a minimum limit value represented as current bit depths of the pixel values, and
wherein the intra prediction and the inter prediction are performed such that a value higher than a highest limit value from among the pixel values of the current picture is transformed to correspond to the maximum limit value, a value less than a lowest limit value from among the pixel values of the current picture is transformed to correspond to the minimum limit value, and pixel values between the highest limit value and the lowest limit value from among the pixel values of the current picture are transformed to correspond one to one with values between the maximum limit value and the minimum limit value.

38. An apparatus for decoding a video by using dynamic range transformation based on content, the apparatus comprising:
- a parser which extracts encoded data of a current region of original video by parsing a received bitstream;
- an entropy decoder which restores data symbols by performing entropy decoding on the extracted encoded data;
- an inverse quantization and inverse transformer which restore residual data for the current region by performing inverse quantization and inverse transformation on the restored data symbols;
- an intra predictor which performs intra prediction on the restored residual data;
- a motion compensator which performs motion compensation on the restored residual data; and
- an image restoring unit which restores the current region by performing deblocking filtering on the image data restored by the intra prediction and the motion compensation and restores a transformed dynamic range of the current region based on content of an image of the original video,
- wherein restored pixel values expanded in a range of a maximum limit value through a minimum limit value represented as current bit depths of the pixel values are restored, by the image restoring unit, to the dynamic range of the current region, and
- wherein the maximum limit value and the minimum limit value from among the restored image data are restored, by the image restoring unit, to correspond to a highest limit value and a lowest limit value, respectively, from among the pixel values of the current region, and values between the maximum limit value and the minimum limit value from among the restored image data are transformed to correspond one to one with values between the highest limit value and the lowest limit value.

39. A non-transitory computer readable recording medium having embodied thereon a computer program for executing the method of claim 1.

40. A non-transitory computer readable recording medium having embodied thereon a computer program for executing the method of claim 19.

* * * * *